(12) United States Patent
Vanker et al.

(10) Patent No.: US 11,907,620 B2
(45) Date of Patent: *Feb. 20, 2024

(54) SMART PLANS

(71) Applicant: PatCo LLC, Arvada, CO (US)

(72) Inventors: John Louis Vanker, Denver, CO (US);
Michael J. Lastowski, Centennial, CO (US)

(73) Assignee: PATCO, LLC, Arvada, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,318

(22) Filed: Dec. 2, 2021

(65) Prior Publication Data

US 2022/0092226 A1 Mar. 24, 2022

Related U.S. Application Data

(63) Continuation of application No. 15/918,609, filed on Mar. 12, 2018, now Pat. No. 11,222,145.

(Continued)

(51) Int. Cl.
*G06F 30/13* (2020.01)
*G06F 3/0482* (2013.01)
(Continued)

(52) U.S. Cl.
CPC ............ *G06F 30/13* (2020.01); *G06F 3/0482* (2013.01); *G06F 3/04815* (2013.01);
(Continued)

(58) Field of Classification Search
CPC .... G06F 30/13; G06F 3/04815; G06F 3/0482; G06F 3/04845; G06F 3/04847; G06F 2111/20
See application file for complete search history.

(56) References Cited

U.S. PATENT DOCUMENTS 8,260,628 B2 9/2012 Lopez et al.
2007/0174027 A1 7/2007 Moiseyev
(Continued)

FOREIGN PATENT DOCUMENTS

EP 2113616 A1 11/2009
JP 10-162050 A 6/1998
(Continued)

OTHER PUBLICATIONS

Notification of Reasons for Refusal issued in related Japanese patent application No. 2019-549423, dated Mar. 29, 2022, 10 pages.
(Continued)

*Primary Examiner* — Chuen-Meei Gan
(74) *Attorney, Agent, or Firm* — Holzer Patel Drennan

(57) ABSTRACT

A smart plan portal that is used in conjunction with a computer aided design (CAD) software application module. The smart plan portal provides a library of predesigned elements that are presented for selection and placement for building design. Each placed element automatically integrates with adjacent elements and the overall building design. Based on the building design using the library of elements, structural components and equipment components are generated. Each component is associated with a digital identifier that is used to identify a number of attributes for the associated component.

17 Claims, 22 Drawing Sheets

Related U.S. Application Data

(60) Provisional application No. 62/469,986, filed on Mar. 10, 2017.

(51) Int. Cl.
*G06F 3/04845* (2022.01)
*G06F 3/04847* (2022.01)
*G06F 3/04815* (2022.01)
*G06F 111/20* (2020.01)

(52) U.S. Cl.
CPC ...... *G06F 3/04845* (2013.01); *G06F 3/04847* (2013.01); *G06F 2111/20* (2020.01)

(56) References Cited

U.S. PATENT DOCUMENTS

| | | | |
|---|---|---|---|
| 2008/0275673 A1* | 11/2008 | Klipfel | G06F 30/13 703/1 |
| 2010/0198563 A1* | 8/2010 | Plewe | G06F 30/17 703/1 |
| 2011/0191069 A1 | 8/2011 | Madsen et al. | |
| 2012/0221986 A1 | 8/2012 | Whitford et al. | |
| 2013/0024797 A1 | 1/2013 | Faulkner | |
| 2013/0185026 A1* | 7/2013 | Vanker | E04B 1/08 703/1 |
| 2015/0248504 A1 | 9/2015 | Glunz et al. | |
| 2016/0179342 A1 | 6/2016 | Aditazz | |
| 2016/0210377 A1* | 7/2016 | Bumbalough | G06F 30/13 |
| 2016/0210569 A1 | 7/2016 | Enck | |
| 2017/0132568 A1 | 5/2017 | Glunz | |
| 2017/0256097 A1 | 9/2017 | Finn et al. | |
| 2018/0075168 A1 | 3/2018 | Tiwari et al. | |

FOREIGN PATENT DOCUMENTS

| | | |
|---|---|---|
| JP | 2015055123 A | 3/2015 |
| WO | 2010000017 A1 | 1/2010 |
| WO | 2014100243 A1 | 6/2014 |
| WO | 20160138531 A1 | 9/2016 |

OTHER PUBLICATIONS

Written Opinion dated Aug. 20, 2020 by the Intellectual Property Office of Singapore for Patent Application No. 11201908336X.
Extended European Search Report filed in EP Application No. 18764982.7, dated Nov. 30, 2020, 8 pages.

* cited by examiner

1200

SMART PLANS

CROSS-REFERENCE TO RELATED APPLICATIONS

The present application is a continuation application of U.S. application Ser. No. 15/918,609 entitled "SMART PLANS," filed Mar. 12, 2018, which claims benefit of U.S. Provisional Application Ser. No. 62/469,986 entitled "SMART PLANS," and filed Mar. 10, 2017, which are incorporated herein by reference for all that they disclose and teach.

BACKGROUND

Building information modeling (BIM) using computer aided design (CAD) software is an expensive and time-consuming process. A user generally designs every aspect of a building including building units (e.g., apartment units, office suites, hotel room), structural components (e.g., columns, framing), equipment components (e.g., HVAC systems, plumbing). In some instances, equipment and/or structure may be designed on the fly at the building site.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

The present application discloses smart plan portal that may be used in conjunction with a computer aided design (CAD) software application module for building information modeling (BIM). The smart plan portal provides a library of predesigned elements that are presented for selection and placement for building design. Each placed element automatically integrates with adjacent elements and the overall building design. Based on the building design using the library of elements, structural components and equipment components are generated. Each component is associated with a digital identifier that is used to identify a number of attributes for the associated component.

BRIEF DESCRIPTIONS OF THE DRAWINGS

DETAILED DESCRIPTIONS

Figure 1:
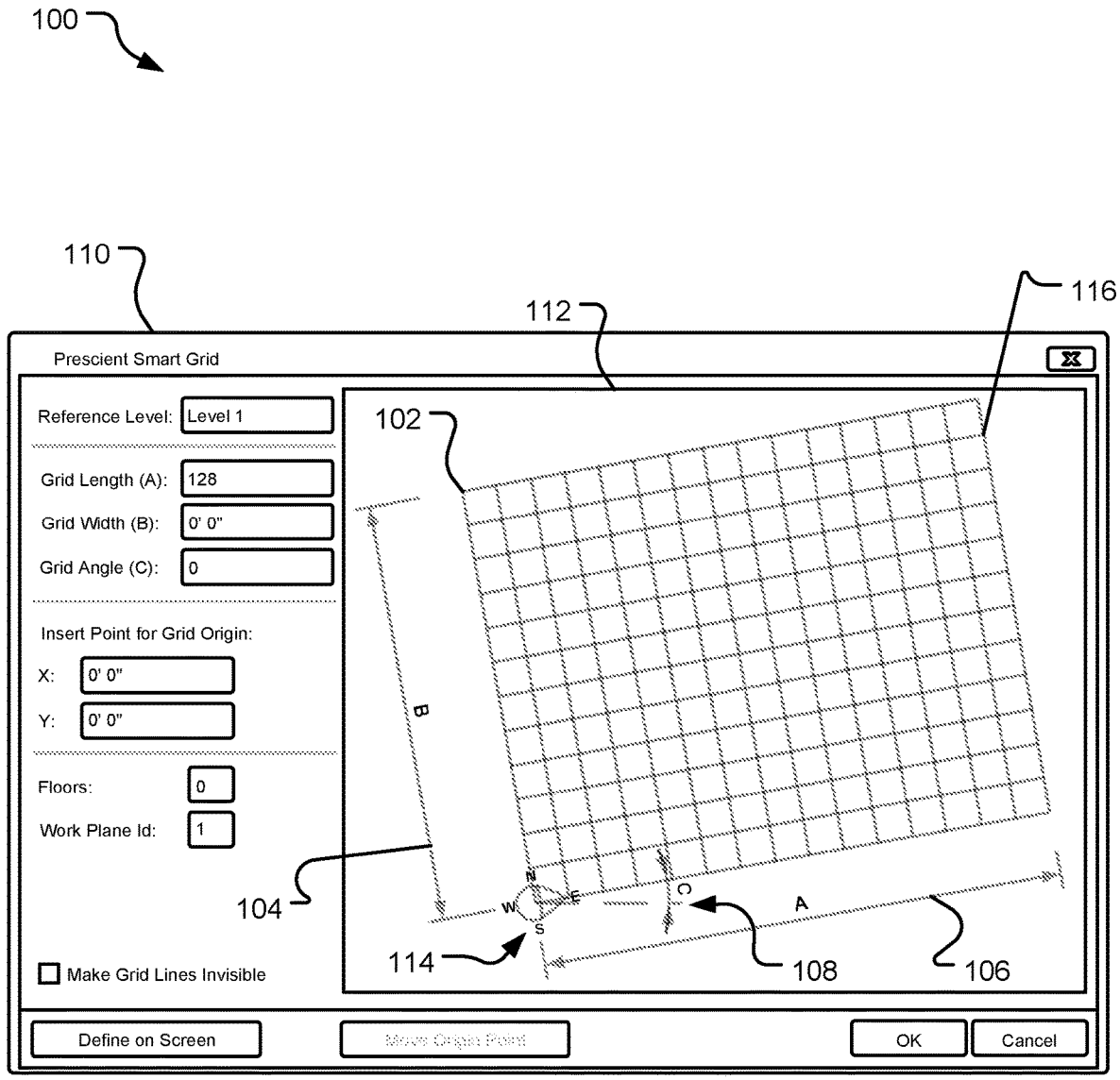
FIG. 1 illustrates an example user interface for designating a geometric grid for building design using a smart plan system described herein.

The system described herein provides a smart plan portal that may be used with computer aided design (CAD) software. Example CAD software includes Revit architectural design software from Autodesk. The portal provides a geometric grid-based building design system that allows a standardized predesigned library of elements (e.g., apartment units, office suites, retail spaces, structures, elevators, stairs) to be selected and placed on the geometric grid to create a building design. The building designed with the standardized library of elements may be converted to structural components (e.g., wall panels, framing members, trusses, floor panels, etc.). The smart plans system further allows equipment to be automatically imported into the building design based on the selected elements and arrangement of the elements. Such equipment includes HVAC systems, electrical components, plumbing, etc. The portal provides filterable viewing system that allows a user to view the building design (and predesigned elements) with specification detail layers such as structural components, selected elements, equipment, structure and mechanical coordination, plumbing, furniture, etc. The portal automatically provides the livable area, total area, number of units by unit type, etc. Thus, the portal provides a streamlined, efficient, user friendly, building design user interface and system.

The library of elements includes predesigned units such as apartment units and office suites, retail spaces, common areas, stairwells, elevators, etc. for any multiunit building type. The predesigned elements can be added to the geometric grid to create a building design. The predesigned elements are configured such that they automatically integrate with each other in the building design. As the building is designed using the smart plan portal, system and component bills of materials may be generated. The bill of materials is filterable based on material type, floor, unit type, etc. Financial models for manufacture of materials, installation of components, etc. may be automatically generated based on the building design. In some implementations, the smart plan portal is cloud based such as to allow remote collaboration in building design.

Outputs are generated based on the building design. Such outputs include, for example, a bill of materials, a materials list, 3-D Models, machine control files, shop drawings and specifications, etc. Furthermore, a digital identification is generated for each structural component and/or equipment component. The digital identification is a datastream that includes data that indicates the type of component, component material, component location and direction relative to the grid (e.g., xyz location), component attachments (e.g., components that the subject component connects to), etc. The machine control files may be transferred to roll forming machines, welding machines, robots, etc. to generate the structural components for the building design.

The user interfaces in the following figures are described with respect to a smart plans portal. It should be understood that the user interfaces are described for illustrative purposes and that other layouts of user interfaces may be implemented. Furthermore, the user interfaces are only parts of the overall smart plans portals. As such, certain user interfaces are excluded for illustrative purposes.

FIG. 1 illustrates an example user interface 100 for designating a geometric grid 102 for building design using a smart plan system described herein. The user interface includes an attribute pane 110 and a view window 112. The attribute pane provides a number of fields that a user may adjust. The fields include geometric grid length, width, angle, origin attributes, number of floors etc. As the user enters values for each field, the entered values will be automatically reflected in the view window 112. The view window illustrates a geometric grid 102 having a width B 104, and a length A 106, and an origin 114. The geometric grid is offset by an angle c 108 relative to a horizontal line. The geometric grid width B 104, height A 106, and geometric grid angle c 108 are generated based on the fields in the attribute pane 140. It should be understood that the geometric grid 102 is for illustrative purposes and may not reflect the values entered in the attribute pane 110.

The geometric grid length A 106, width B 104, origin 114, and angle C 108 may be selected based on a real property area selected for the building. Furthermore, the geometric grid 102 may be composed of a number of standardized sized squares (e.g., a square 116). Such squares may be 2 feet (ft.) by 2 ft., but it should be understood that the length and width of the squares may be greater or less than 2 ft. In some implementations, the geometric grid 102 is based on 1 inch (in.) by 1 in. squares or smaller squares (e.g., a smaller granularity). The geometric grid 102 is used to design a building. For example, pre-designed elements of the building such as units (e.g., apartment units, hotel rooms, office suites), structures (e.g., staircases), elevators, etc. are selected and placed on the geometric grid 102. After placement, the elements (and the element's constituent parts) may be referenced according to one or more geometric grid squares. For example, a wall of an apartment unit may be placed along an edge of one or more of the squares of the geometric grid 102. In other words, certain structural components (e.g., a wall panel) of elements are positioned relative to one or more squares of the geometric grid 102. The position, direction, etc. of each of the structural components and other components of a building design may be referenced according to the geometric grid squares and/or one or more lines of the geometric grid 102 The placement of elements relative to the geometric grid 102 may be extended through one or more floors of the building.

Figure 2:
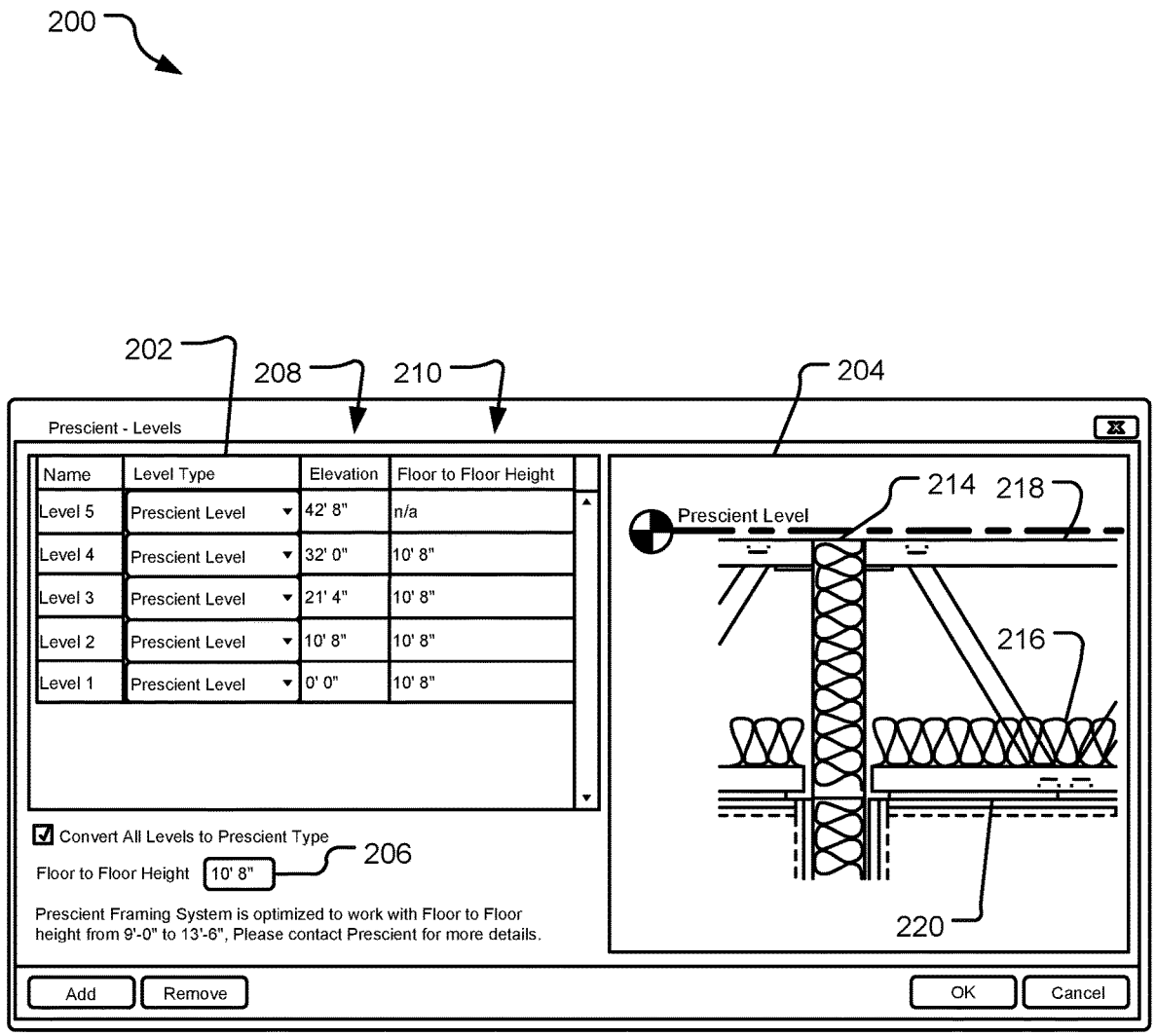
FIG. 2 illustrates an example user interface for designating a number of floors for a building design using the smart plan system described herein.

FIG. 2 illustrates an example user interface 200 for designating a number of levels for a building design using the smart plan system described herein. The user interface 200 includes an attribute pane 202 and a view window 204. The user interface 200 provides fields such that a user may design one or more levels of a building. In a field 206, a user may enter a value for a floor to floor height of one or more levels of the building. After the height is entered, the user clicks add, which automatically adds a floor with the entered value. The attribute pane 202 illustrates that 5 levels have been added. An elevation column is automatically populated based on the number of levels and the floor to floor height of each level. The floor to floor height may be adjusted in the floor to floor height column 210. The levels are illustrated having a level type (e.g., in a level type column 212) of "Prescient Level." The prescient level type defines a set of standardized structural components (e.g., wall panels, floor panels, trusses) comprising a system. It should be understood that other floor types are contemplated.

The view window 204 illustrates an example view of a Prescient Level type. The prescient level type includes partially illustrated layers of insulation 214 and 216, truss structure 218, and a wall pane 220. A user may pane and/or zoom in the view window 204 to view the different structural components of the floor type. After the user has configured the one or more levels of the building the user may select "OK" and start designing and adding elements to different levels of the building.

Figure 3:
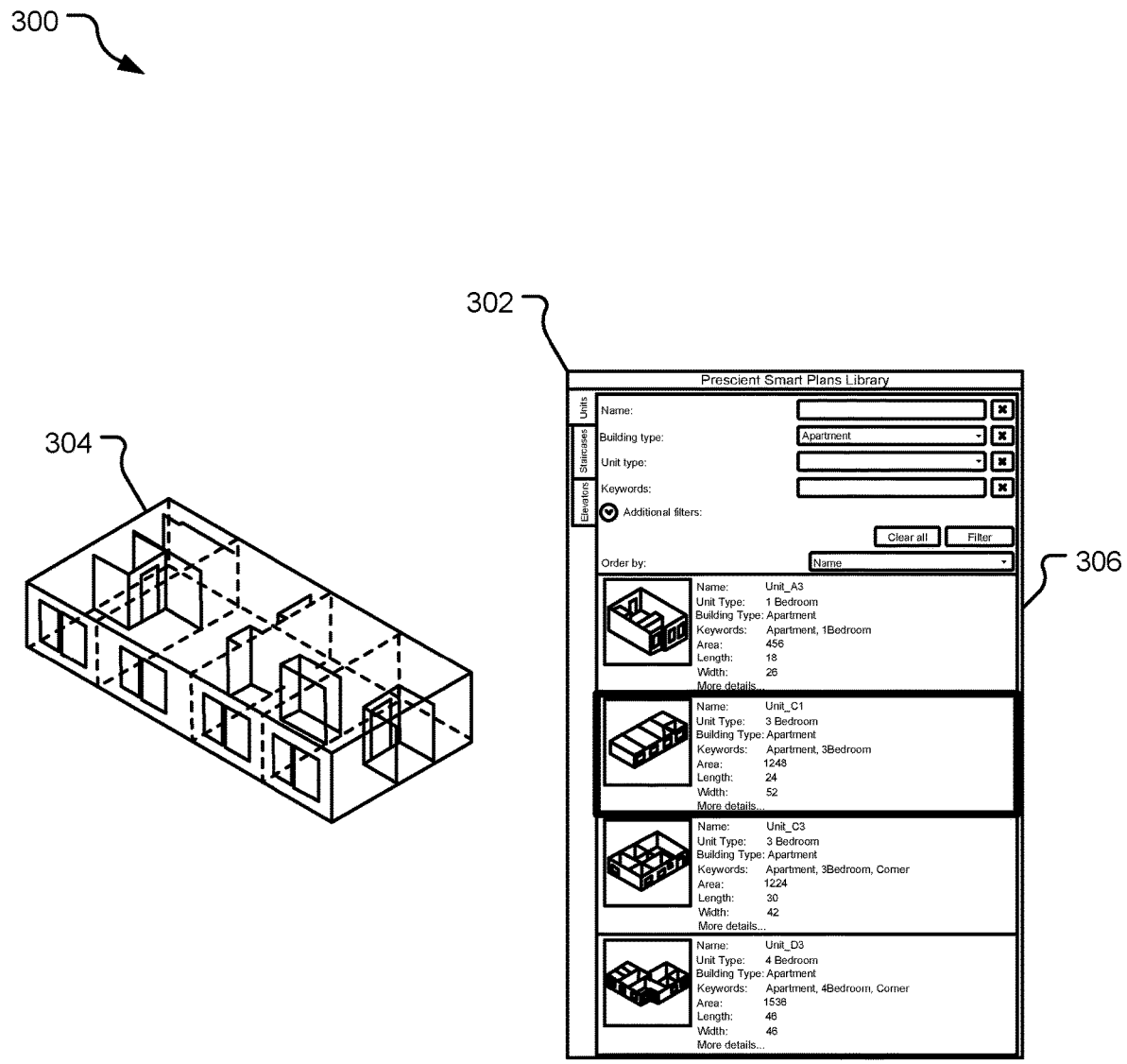
FIG. 3 illustrates an example user interface for selecting one or more elements from a library of elements for a building design using the smart plan system described herein.

FIG. 3 illustrates an example user interface 300 for selecting one or more elements from a library of elements for a building design using the smart plan system described herein. The user interface 300 includes a library pane 302 and a view area 304. The library pane 302 is configured to display one or more predesigned elements that may be used in a building design. The one or more elements may include one or more units (e.g., a unit 306), staircases, or elevators. The units may be apartment units (illustrated), office suites, etc. The units may be units predesigned using standardized structural components (e.g., wall panels, trusses, floor panels, etc.). The apartment units include a number of different layouts and configurations (e.g., two bedrooms, studio, etc.). The library pane 302 is configured such that a user may sort the elements by name, building type, unit type, keywords, number of bedrooms, square feet, corner room, etc. Furthermore, tabs 308 allow a user to navigate to staircases and elevators.

The elements in the library pane 302 are selectable such that an expanded view is shown in the view area 304. The user can select the element in the view area, zoom, and pane to view the element design. Furthermore, the unit shown in the view area 304 may be viewed such as to show different rooms, doors, appliances, electrical components, HVAC systems, structural components, etc. The elements are further selectable such that they can be added to the geometric grid (as shown in FIG. 1) of the building design. When one or more elements are added to the geometric grid, they can be arranged to provide a floor plan for the building design.

Furthermore, as elements are placed on the grid, certain components of the elements may snap to the grid. For example, a wall panel of a predesigned apartment unit may snap to a certain line or square of the grid. As such, the library of predesigned elements allows a user to easily provide a custom floor plan.

Figure 4:
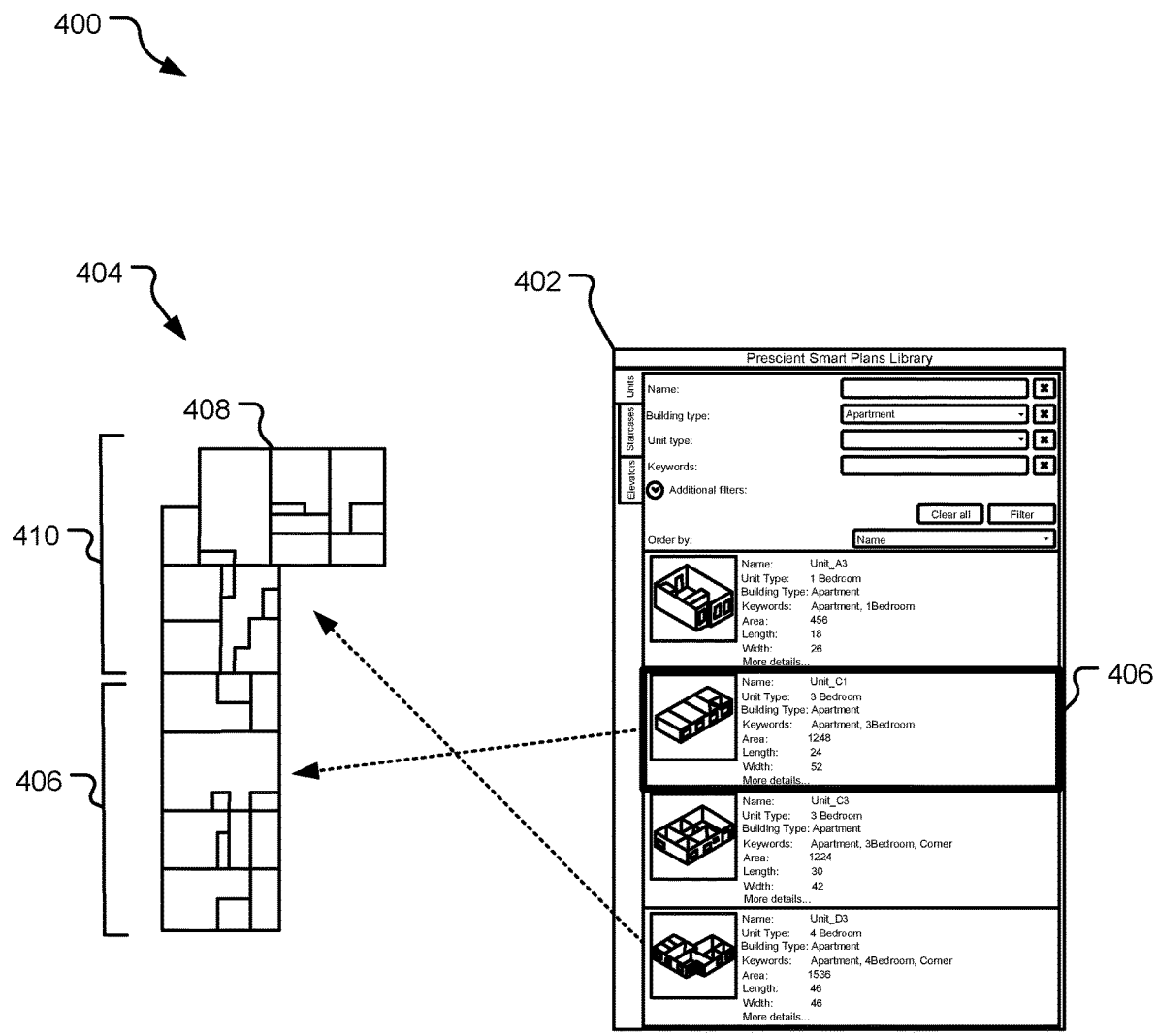
FIG. 4 illustrates an example user interface for designing a floor of a building using the smart plan system described herein.

FIG. 4 illustrates an example user interface 400 for designing a floor plan of a building using the smart plan system described herein. The user interface 400 includes a library pane 402 and a view area 404. The library pane 402 displays a plurality of selectable units (e.g., a unit 406) that may be added to a floor plan 408 illustrated in view area 404. Specifically, the floor plan 408 is a partial floor plan with a D3 unit 410 and a C1 unit (the unit 406) with a shared wall. Because the units (e.g., the D3 unit 410 and the C1 unit 406) may be designed using standardized components (e.g., wall panels), they may be arranged with shared walls and automatically integrated. Furthermore, the floor plan 408 is designed on a geometric grid (not shown), such that all elements may be referenced using one or more squares of the geometric grid. In the library pane 402, the user may selectively filter and sort units by tape, size, shape, location (e.g., corner or standard room), etc. The user may further select a specific unit to get a detailed view of the unit (e.g., 3-dimensional view of layout, components, equipment). The predesigned units (e.g., the unit 406) are fully detailed to a construction specification level and can be displayed in a variety of view and specification detail layers.

Figure 5:
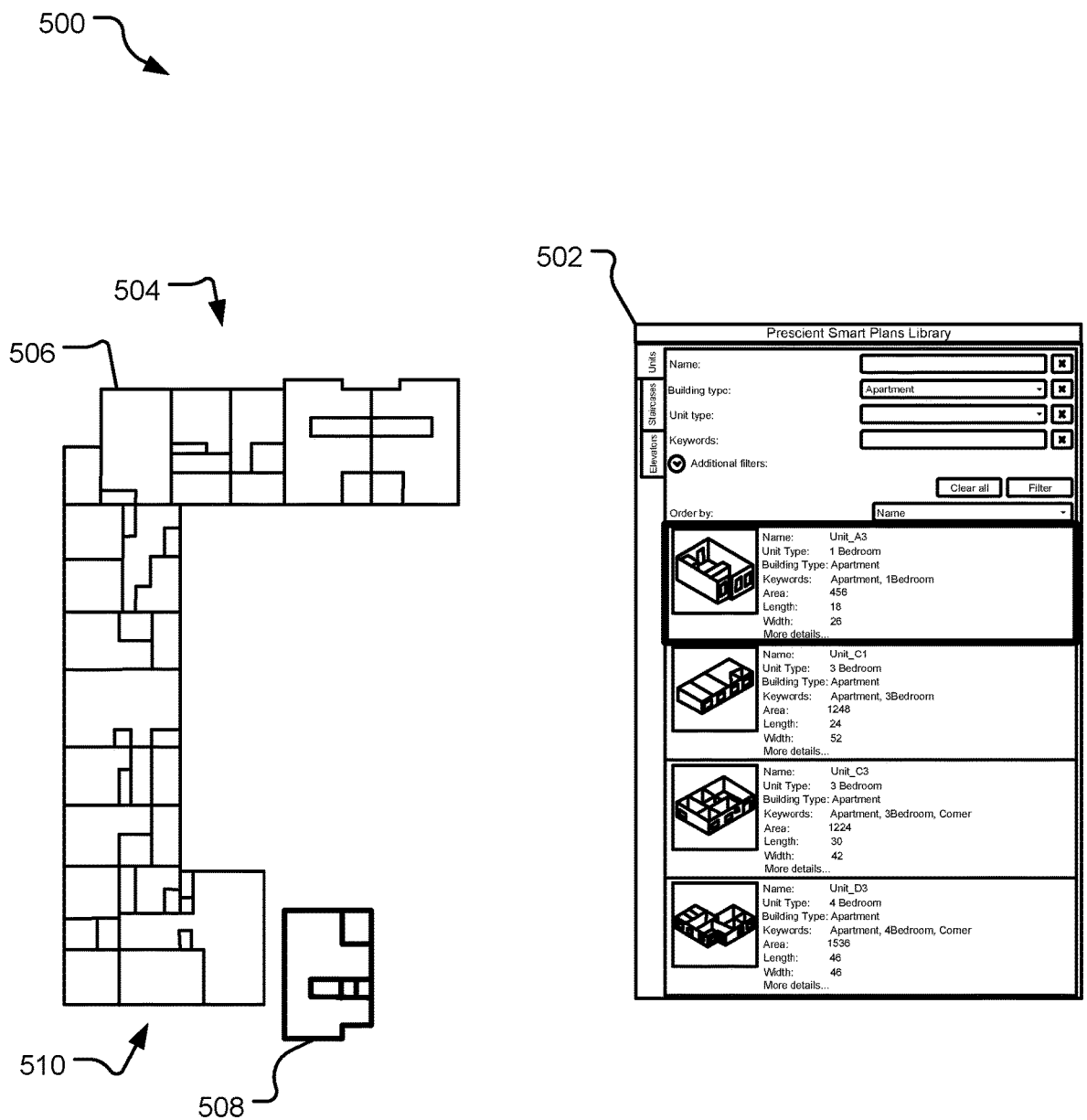
FIG. 5 illustrates another example user interface for designing a floor of a building using the smart plan system described herein.

FIG. 5 illustrates another example user interface 500 for designing a floor plan of a building using the smart plan system described herein. The user interface 500 includes a library pane 502 and a view area 504. In the view area 504, a floor plan 506 is shown that is designed using the smart plan portal provided herein. Specifically, the floor plan 506 further illustrates the partial floor plan provided in FIG. 4. A user is adding a new unit 508 (an A3 unit) to the floor plan 506. The new unit 508 is not connected to (sharing a wall with) the other units. The new unit 508 is selectable and moveable (e.g., by dragging) such that the new unit 508 can be connected to the other units. Furthermore, the units can be rotated such as to provide a custom design. As new units are added, equipment layouts (e.g., plumbing, HVAC, and electrical systems) are automatically generated based on the arrangement of the predesigned units. For example, as the new unit 508 is added, its predesigned plumbing requirements are automatically connected to (e.g., integrated with) the plumbing requirements of an adjacent unit 510. The new unit 508 and adjacent unit 510 may be connected to an automatically generated water feed for the entire floor a portion of the floor. In the library pane 502, the user may selectively filter and sort units by tape, size, shape, location (e.g., corner or standard room), etc.

Figure 6:
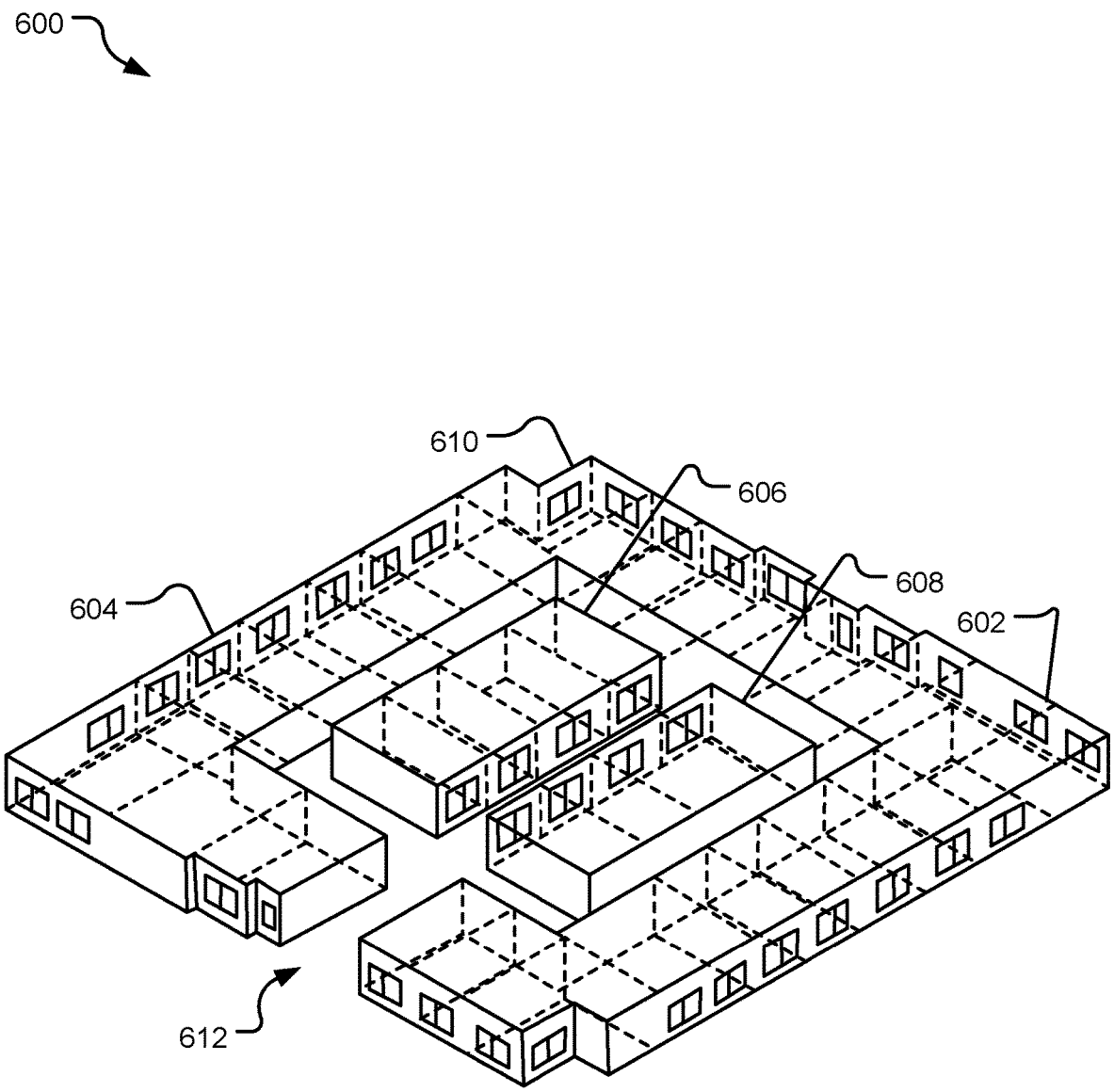
FIG. 6 illustrates a view of an example floor design using the smart plan system described herein.

FIG. 6 illustrates a three-dimensional view 600 of an example floor plan 610 designed using the smart plans portal disclosed herein. The floor plan includes a plurality of outside units (e.g., units 602 and 604) and two interior units 606 and 608. The floor plan 610 layout is for illustrative purposes, and it should be understood that other floor layouts may be designed. The three-dimensional view 600 is an example of a type of view that may be realized using the smart plan portal described herein. The arrangement of different units provides a hallway 612 through which the units may be accessed. The hallway 612 is automatically generated based on the placement of different units on a geometric grid (not shown).

A user can pan and zoom to observe different parts of the floor plan. Furthermore, different elements may be filtered and added. For example, the user may view the structural components making up the floor plan (e.g., wall panels, trusses, and floor panels). The user may further view and revise the equipment layout (e.g., HVAC, plumbing, and electrical), which is automatically generated based on the arrangement of the predesigned units. Furthermore, menus (not shown) provide the ability to view total floor area (e.g., in square ft.), total livable floor area, etc.

Figure 7:
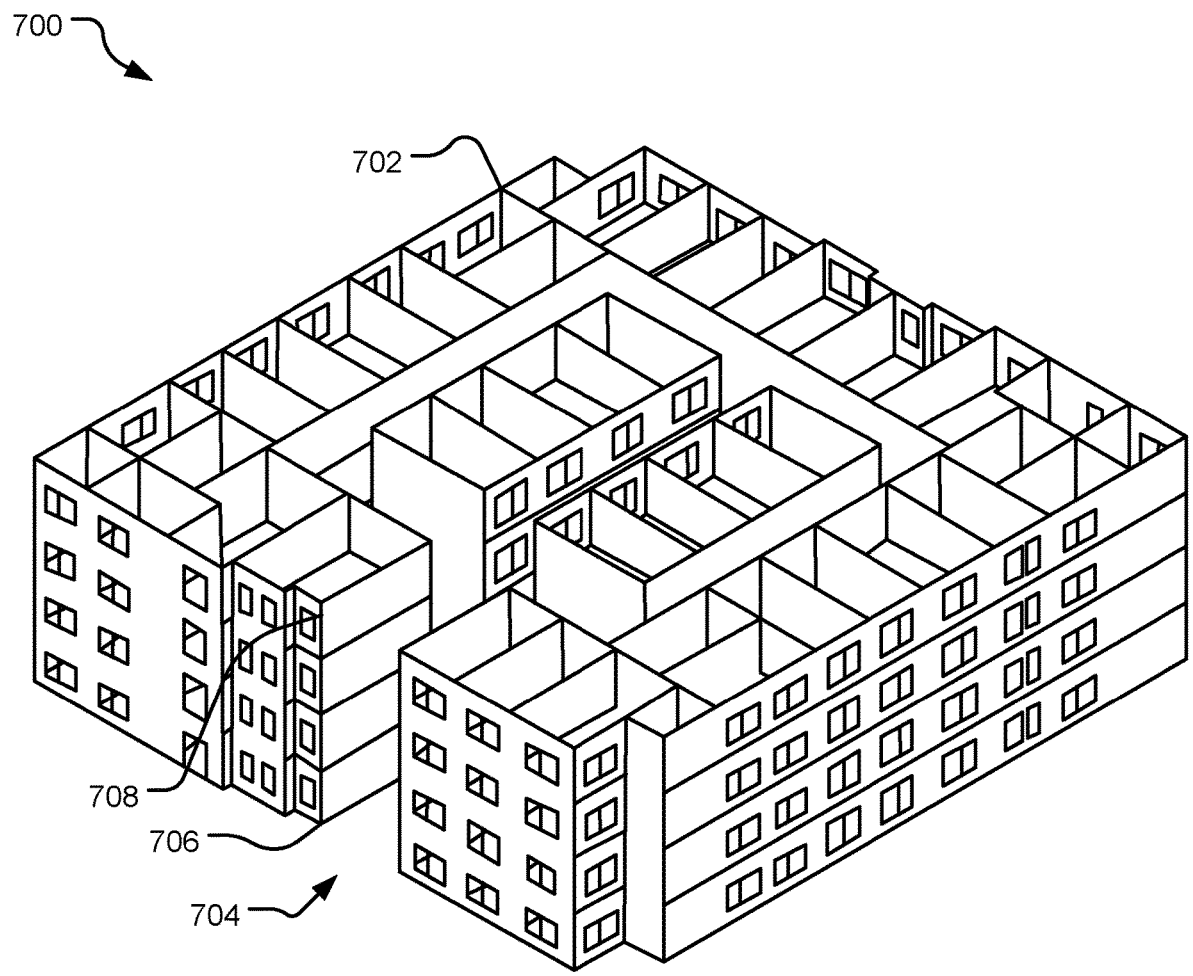
FIG. 7 illustrates an example user interface for designing a building and generating structural components of the building using the smart plan system described herein

FIG. 7 illustrates a three-dimensional view 700 of an example building design 702. Specifically, FIG. 7 illustrates the floor plan illustrated in FIG. 6 extended to multiple floors (e.g., five total floors). The view 700 is generated using the smart plans portal described herein. The smart plan system is configured such that a user may design a single floor plan and extend that designed single floor plan to multiple floors, without having to separately design each floor. At this stage of design, the user may want to insert a staircase and/or elevator element. The library (discussed above with respect to FIG. 3) may provide one or more predesigned elevators and staircases. A library pane (not shown) displays these elements, which are selectable such that they may be placed in the building design 702 (e.g., in a space 704). The staircase and elevator elements may be predesigned with standardized structural components (e.g., wall panels, floor panels, trusses) or predesigned to fit or mesh with the standardized structural components from which units (e.g., units 704 and 706) were predesigned. As such, the staircase and/or elevator elements may be placed, and the elements may automatically integrate with the structural components of the units and the equipment (e.g., electrical systems, HVAC, plumbing).

Figure 8:
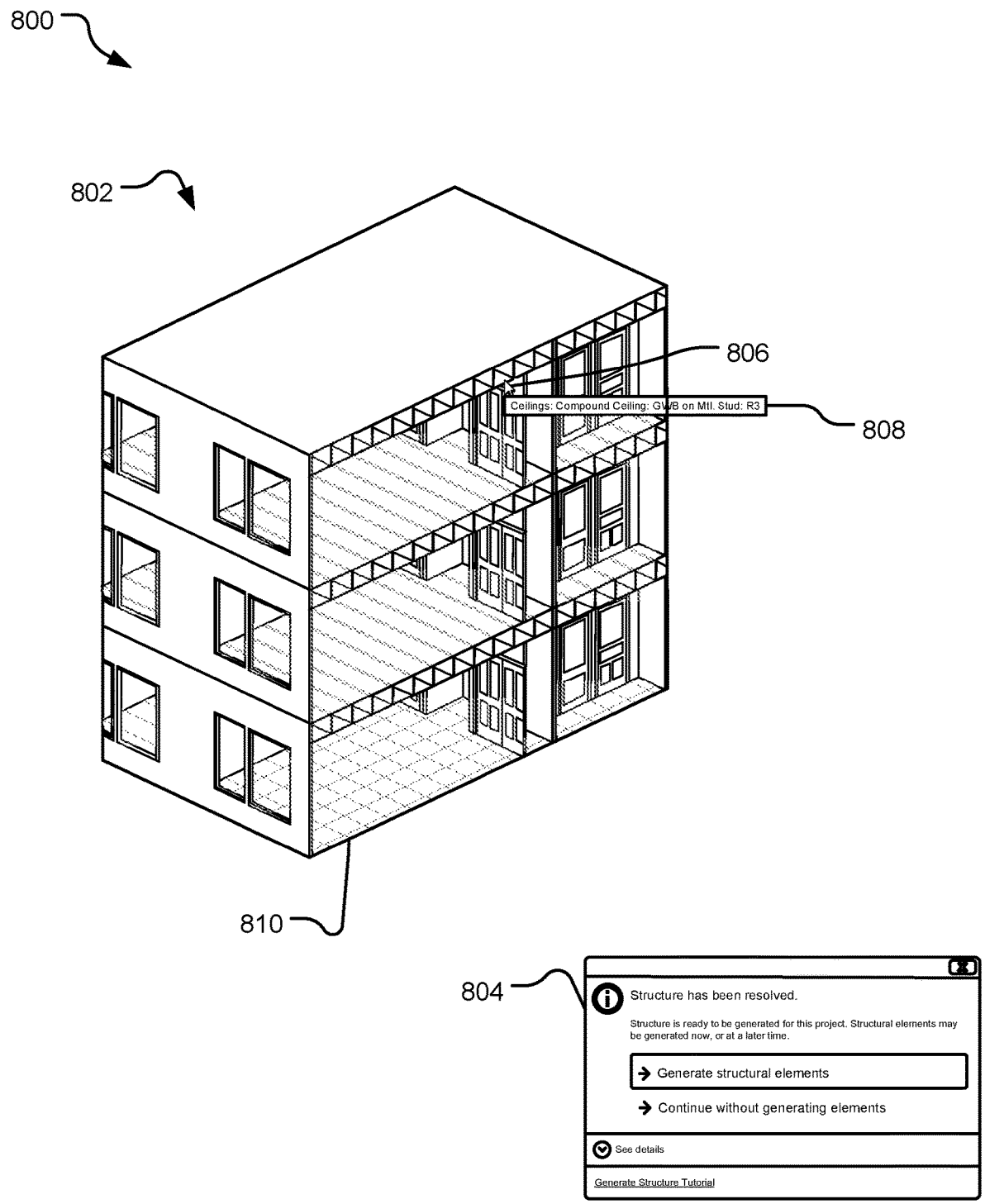
FIG. 8 illustrates another example three-dimensional view of an example building design and a user interface for generating structural components for the building design.

FIG. 8 illustrates another example three-dimensional view 800 of an example building design 802 and a user interface 804 for generating structural components (e.g., wall panels, trusses, floor panels) for the building design 802. Specifically, the three-dimensional view 800 shows specific attributes such as walls, doors, floors. The view 800 is generated using the smart plans portal described herein. In this and other views, the user smart plans portal allows a user to mouse over elements to determine the name and type of element. In design 802, a mouse indicator 806 is over a ceiling panel. A displayed text box 808 informs the user of the type of ceiling element. The user can mouse over other elements such as doors, wall panels, floor panels, windows, etc. Furthermore, all elements of the building design may be referenced with respect to a displayed geometric grid 810. For example, a wall panel's location and/or direction may be determined with respect to one or more lines or squares of the geometric grid 810 When the building design 802 is substantially complete, the smart plans system is configured to allow a user to generate the structural components based on the building design 802 using the user interface 804.

Figure 9:
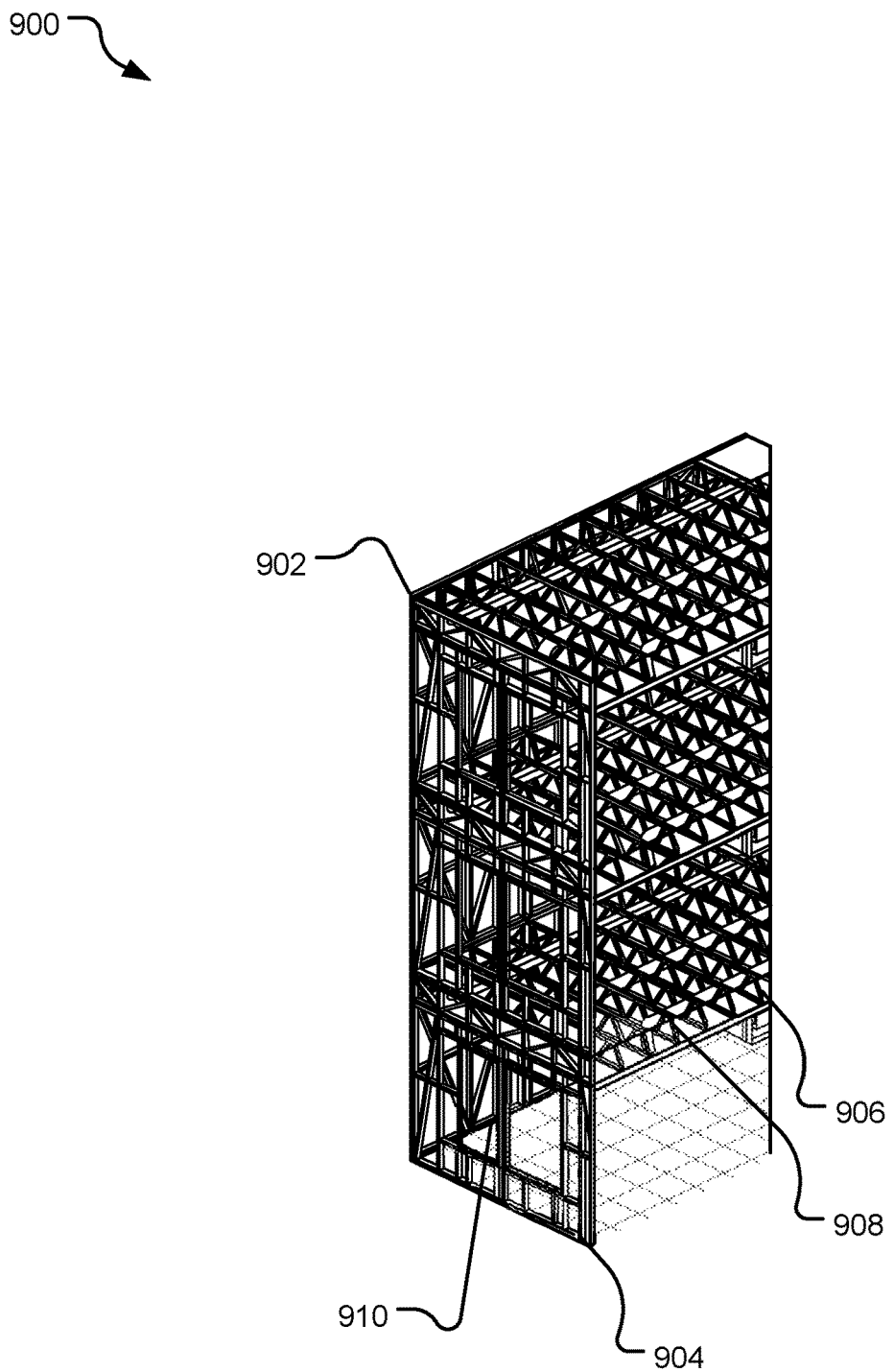
FIG. 9 illustrates another example three-dimensional view of an example building design.

FIG. 9 illustrates another example three-dimensional view 900 of an example building design 902. Specifically, FIG. 9 illustrates the structural components generated from the building design 802 in FIG. 8. The view 900 is generated using the smart plans portal described herein. The structural components include various wall panels (e.g., a wall panel 904), trusses (e.g., truss 906), windows (e.g., a window 910), etc. The structural components are generated based on the units (e.g., apartment units) that are predesigned using standardized structural components. Because the structural components are standardized, they are easily integrated into the building design 902.

Using the smart portal system described, a listing of structural components required for the building design 902 may be generated using the smart plan portal (e.g., a bill of materials). Furthermore, the bill may be filtered and viewable based on different floors of the building design, component type, equipment type, etc. This allows the structural components for each floor to be manufactured and delivered separately. For example, the structural components for the first floor of the building design 902 may be manufactured and delivered to the building site first. While the first-floor structural components are being installed, the second-floor structural components may be manufactured and delivered upon completion of installation of the first floor, etc.

As the structural components are generated for the building design 902, digital identifications (IDs) are generated for each structural component and/or equipment component. The generated IDs may represent data such as component name, type, material, location and direction relative to the grid, adjacent component(s), how the adjacent component(s) is attached, etc.

Figure 10:
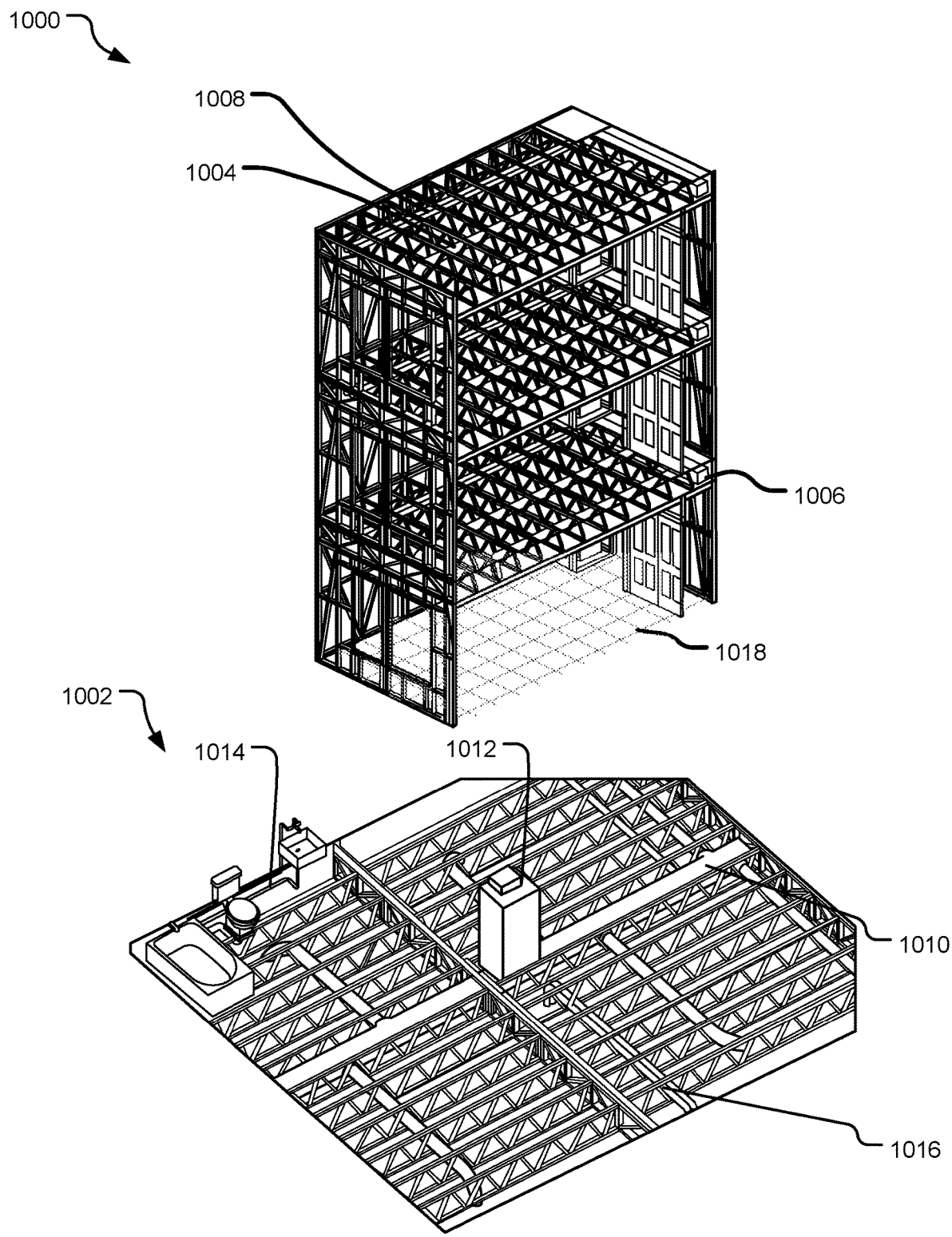
FIG. 10 illustrates example three-dimensional views of a building design.

FIG. 10 illustrates example three-dimensional views 1000 and 1002 of a building design 1004. The views 1000 and 1002 are generated using the smart plans portal described herein. In the view 1000 and 1002, equipment elements are shown. For example, view 1000 illustrates a duct 1007, and electrical wiring 1008. The view 1002 is an expanded view of a floor of the building design 1004. The view 1002 illustrates various ducts (e.g., a duct 1010), an air conditioning unit 1012, water supply pipes (e.g., water supply pipe 1014), and wiring systems (e.g., wiring 1016). The various equipment elements are selectably filterable in the views. For example, a user may selectively view only the HVAC equipment elements such as ducts and air conditioning units, the water supply pipes, waste channels, etc. Furthermore, the elements may be referenced in relation to one or more squares (or lines) of a geometric grid a geometric grid 1018.

In the various views, a user may select a component, such as water supply pipe 1014 to fixate center the current view on the select component. The user may the pan around the select component to view from various angles in 360 degrees. Furthermore, the user can zoom and out on the selected component. As such, the user can view how components integrate with other components.

Figure 11:
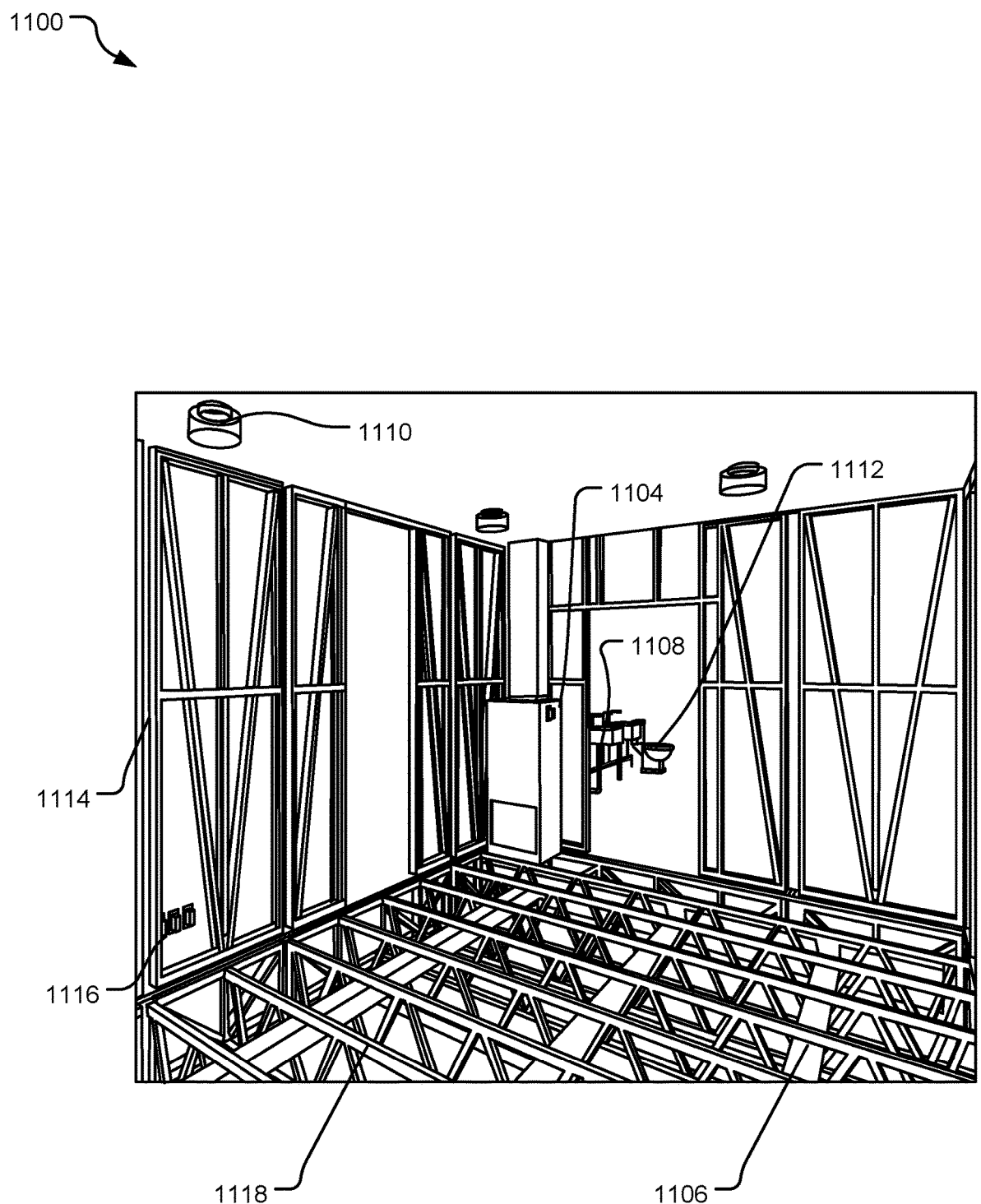
FIG. 11 illustrates another example three-dimensional view of a building design.

FIG. 11 illustrates another example three-dimensional view 1100 of a building design 1102. Specifically, FIG. 11 illustrates a view of the building design 1102 from within one of the units. The view 1100 is generated using the smart plans portal described herein. The building includes an air conditioner unit 1012, various HVAC equipment such as an air conditioning unit 1104 and a duct 1106, water supply piping (e.g., a water supply pipe 1108), various lighting elements such as a lighting element 1110, various bathroom appliances such as a toilet 1112, wall panels (e.g., wall panel 1114), electrical outlets (e.g., electrical outlet 1116), trusses (e.g., truss 1119), etc. A user can view the building design 1102 from areas within the designed and filter various views to show different elements. Furthermore, the equipment elements (pipes, HVAC systems, lighting, etc.) can be viewed using a list feature that can be filtered by floor area, etc. The equipment elements and structural components may be referenced in relation to one or more squares of a geometric grid (not shown).

Figure 12:
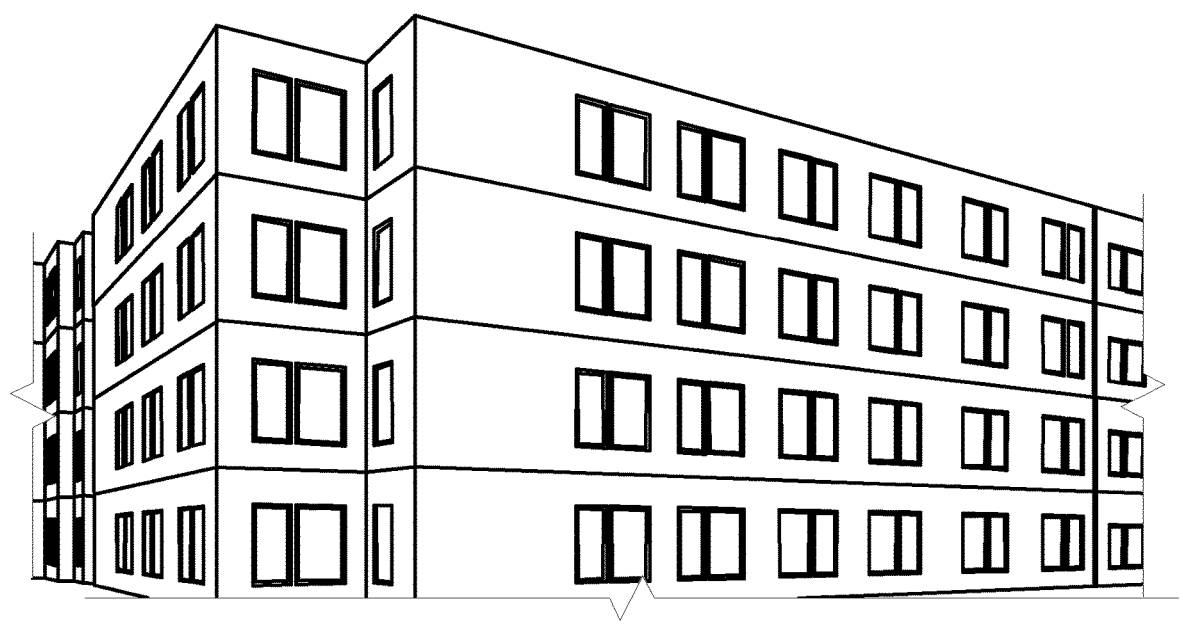
FIG. 12 illustrates example three-dimensional views of a building design.

FIG. 12 illustrates example three-dimensional views 1200 and 1202 of a building design 1204. The views 1200 and 1202 are displayed using the smart plans portal described herein. Specifically, FIG. 12 illustrates an exterior view 1200 of structural components of the building design 1204 and an exterior view 1202 of the building design with wall paneling (e.g., wall paneling 1206). The three-dimensional views may be based on the building design generated based on placement of one or more predesigned elements and placement of the one or more predesigned elements on a designated geometric grid. The placement of the predesigned elements may be extended to multiple floors of a building design to generate the three-dimensional views 1200 and 1202. The three-dimensional views may illustrate interior components or an exterior "skin" (e.g., the look and feel of the exterior surface). In some example implementations, a user may modify the exterior skin based one or more predesigned skins.

Figure 13:
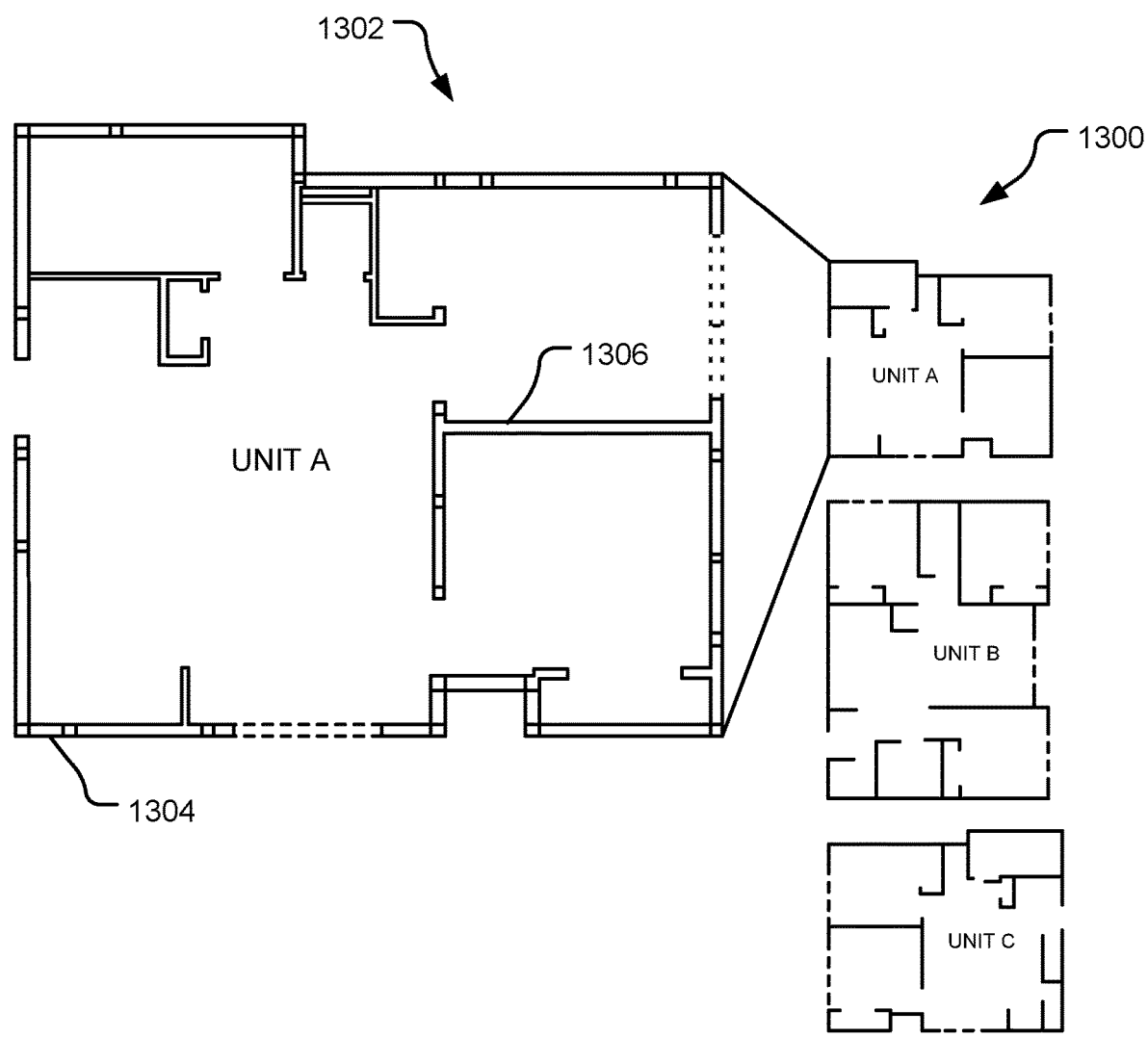
FIG. 13 illustrates example unit designs with and expanded view of a unit design.

FIG. 13 illustrates example unit designs 1300 with and expanded view of a unit design 1302. Specifically, FIG. 13 illustrates example apartment units that may be provided by the library of elements in the smart plans portal. It should be understood that other unit designs are contemplated and may be added to the library of units. The unit design 1302 is an example unit design that is designed based on a plurality of structural components such as wall panels, structural columns, etc. For example, the unit design 1302 includes a plurality of exterior walls (e.g., an exterior wall 1304) that may be based on one or more standardized wall panels. "Exterior wall" does not necessarily mean external to a building, but rather exterior of the unit. Furthermore, one or more interior walls (e.g., an interior wall 1306) may be based on a standardized wall panel. For example, one or more of the standardized wall panels may include openings for windows and/or doors or may be enclosed wall panel (e.g., no windows or doors). The standardized wall panels may be formed of standardized components such as track or stud elements that may be formed using a roll former or other automated machine.

The unit design 1302 may further include placement and positions of one or more equipment components (not shown) including sinks, toilets, showers, HVAC systems, waste drainage, electrical components (circuit breakers, wiring, outlets, lights, light switches, etc.) that may be integrated with the structural components such as the wall panels. Accordingly, the unit design 1302 includes structural components and equipment components in the design. When the unit design 1302 is positioned in a building design using the smart plans portal described herein, the unit design 1302 may be integrated with one or more adjacent unit designs. Such integration may include identifying shared wall panels, linking equipment components, etc. If an identified spacing exists between the placed unit design 1302 and an adjacent design, the smart plans portal may identify a hallway between the units and generate structural components (e.g., wall panels, trusses) for forming the hallway. Furthermore, a digital identification may be associated with the structural components and equipment components that includes information about placement, positioning, etc. of the structural component relative to a digital geometric grid associated with the building design.

Figure 14:
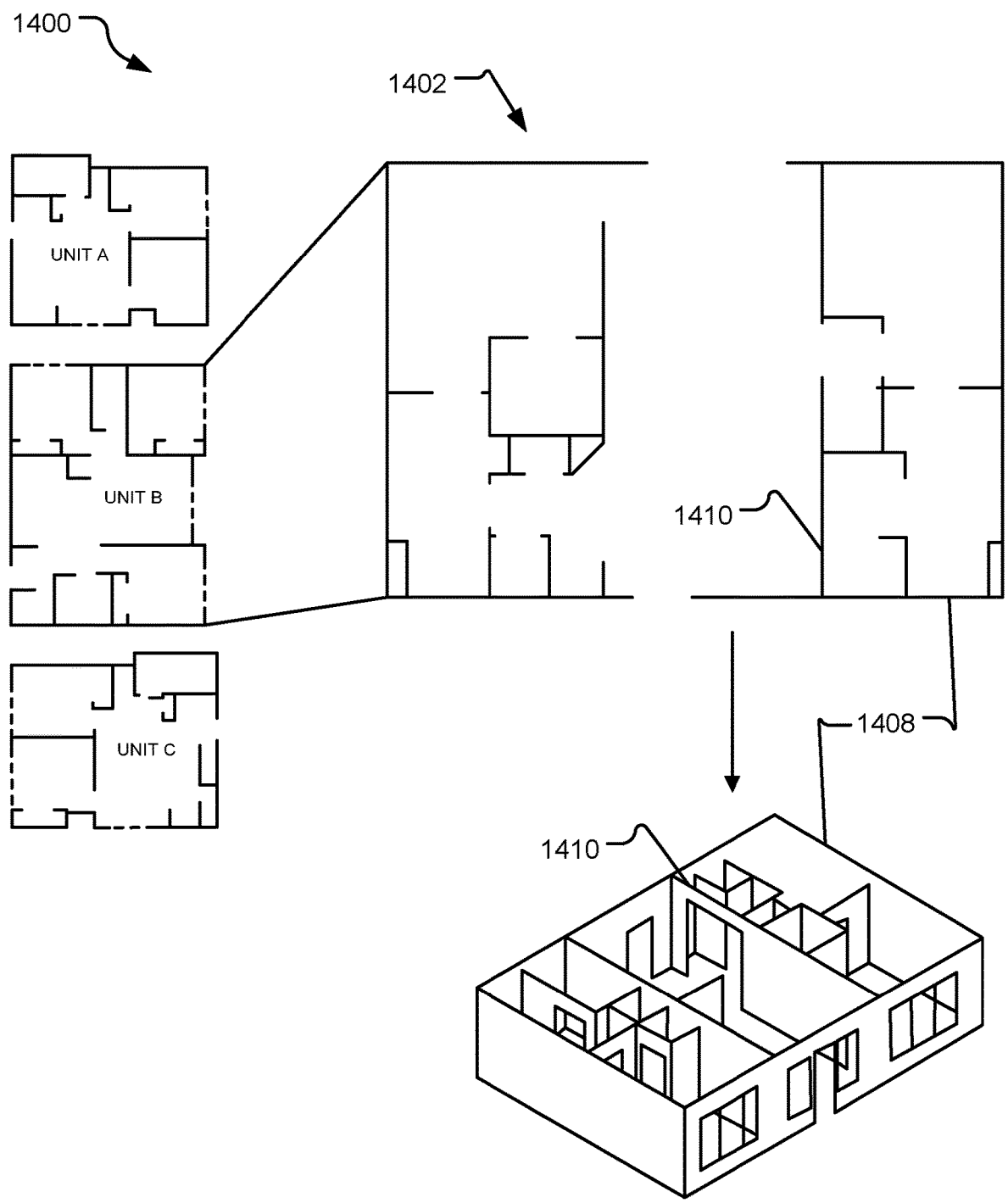
FIG. 14 illustrates example unit designs with an expanded view and three-dimensional view of a unit design.

FIG. 14 illustrates example unit designs 1400 with an expanded view 1402 and three-dimensional view 1404 of a unit design 1406. It should be understood that the unit designs 1400, the expanded view 1402, and the three-dimensional view 1404 are for illustrative purposes and may not correspond specifically to one another. Specifically, FIG. 14 illustrates example apartment units that may be provided by the library of elements in the smart plans portal. The unit design 1406 is an example unit design that is designed based on a plurality of structural components such as wall panels, structural columns, etc. For example, the unit design 1406 includes a plurality of exterior walls (e.g., an exterior wall 1408) that may be based on one or more standardized wall panels. "Exterior wall" does not necessarily mean external to a building, but rather exterior of the unit. Furthermore, one or more interior walls (e.g., an interior wall 1410) may be based on a standardized wall panel. For example, one or more of the standardized wall panels may include openings for windows and/or doors or may be enclosed wall panel (e.g., no windows or doors). The standardized wall panels may be formed of standardized components such as track or stud elements that may be formed using a roll former or other automated machine.

The unit design 1406 may further include placement and positions of one or more equipment components (not shown) including sinks, toilets, showers, bathtubs, HVAC systems, waste drainage, electrical components (circuit breakers, wiring, outlets, lights, etc.) that may be integrated with the structural components such as the wall panels. Accordingly, the unit design 1406 includes structural components and equipment components in the design. When the unit design 1406 is positioned in a building design using the smart plans portal described herein, the unit design 1406 may be integrated with one or more adjacent unit designs. Such integration may include identifying shared wall panels, linking equipment components, etc. If an identified spacing exists between the placed unit design 1406 and an adjacent design, the smart plans portal may identify a hallway between the units and generate structural components (e.g., wall panels, trusses) for forming the hallway. Furthermore, a digital identification may be associated with the structural components and equipment components that includes information about placement, positioning, etc. of the structural component relative to a digital geometric grid associated with the building design.

Utilizing the three-dimensional view 1404 of the unit design 1406, a user may pan around, rotate, and filter the unit design 1506. Such filtering may include rendering solid walls transparent wall panels, equipment components, etc. may be viewed with respect to the unit design 1406. Varying levels of filtering layers may be utilized such as to view different combinations of components (e.g., structural components such as wall panels combined with HVAC systems). For example, a user may view the structural components (e.g., wall panels, trusses, framing) integrated with mechanical coordination (e.g., HVAC, pipes, electrical systems) In some example implementations, furniture diagrams may be included such as to view the unit design 1406 in three-dimensional view with transparent walls and furniture layouts.

Figure 15:
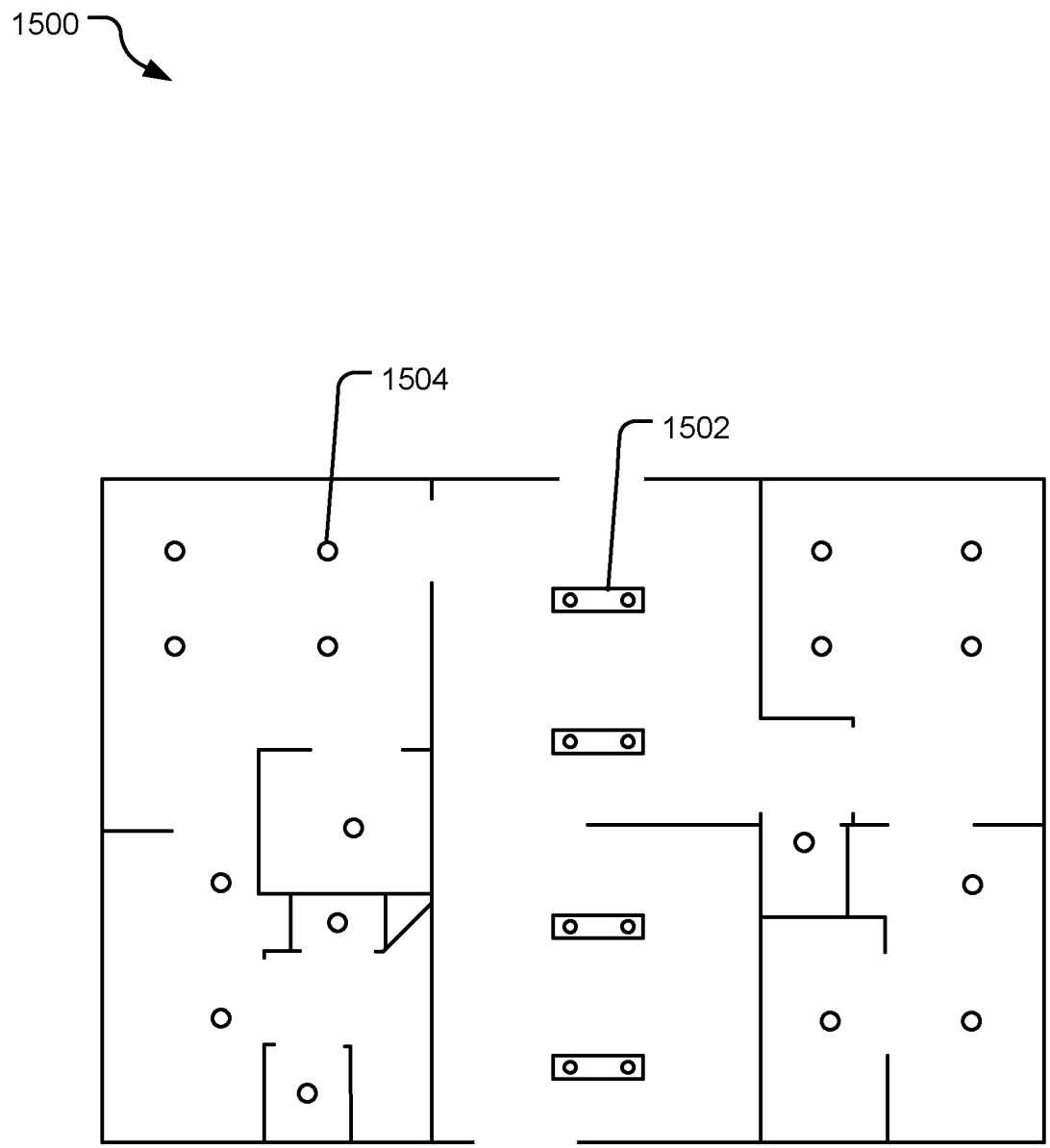
FIG. 15 illustrates an example unit design.

FIG. 15 illustrates an example unit design 1500. Specifically, FIG. 15 illustrates an example apartment unit design with a lighting layout that may be provided by the library of elements in the smart plans portal. The lighting layout of the unit design 1500 includes a plurality of light fixtures (e.g., light fixtures 1502 and 1504). The unit design 1500 is displayed using the smart plans portal described herein. When the unit design 1500 is placed in building design, the lighting layout may be integrated (e.g., electrically connected with) lights of adjacent units or other components. A user utilizing the smart plans portal described herein can use the portal to view varying layers of the unit design 1500. For example, a user may view a three-dimensional view of the unit design 1500 with transparent walls and furniture. Accordingly, the user (e.g., building designer) can view a realistic sense of the layout of the unit.

Figure 16:
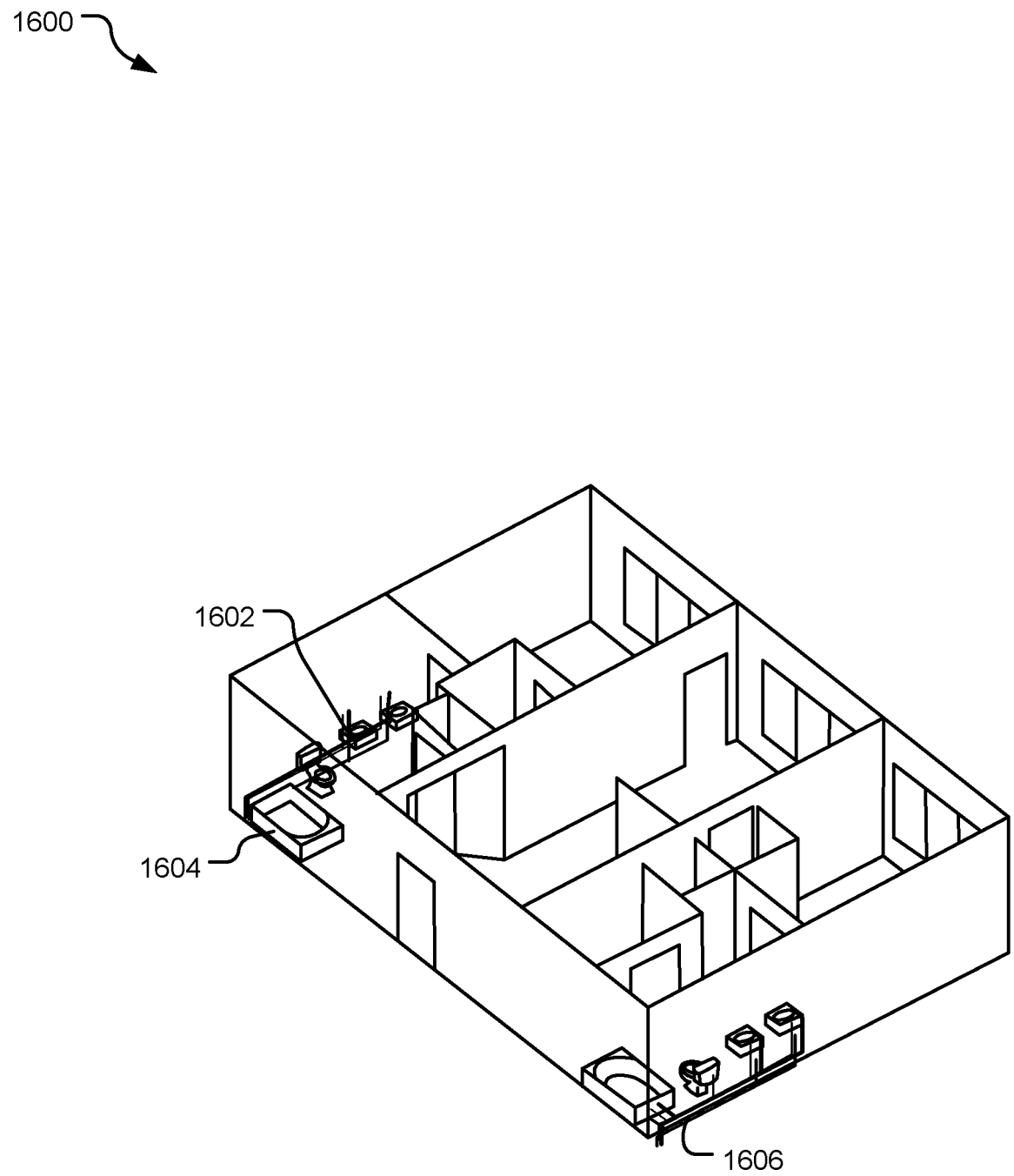
FIG. 16 illustrates a three-dimensional view of an example unit design.

FIG. 16 illustrates a three-dimensional view of an example unit design 1600. Specifically, FIG. 16 illustrates an example apartment unit design that may be provided by the library of elements in the smart plans portal. The unit design 1600 is an example design that is designed using a plurality of standardized structural component such as wall panels. The unit design further includes equipment components such as sinks (e.g., a sink 1602), shower/tub basis (e.g., a basin 1604), and drain pipes (e.g., a drain pipe 1606). Using a user interface displaying the unit design 1500, a user may pan, zoom, etc. to view various components of the unit design, Furthermore, the user may filter and combine different layers to view the various components of the unit design 1600.

Figure 17:
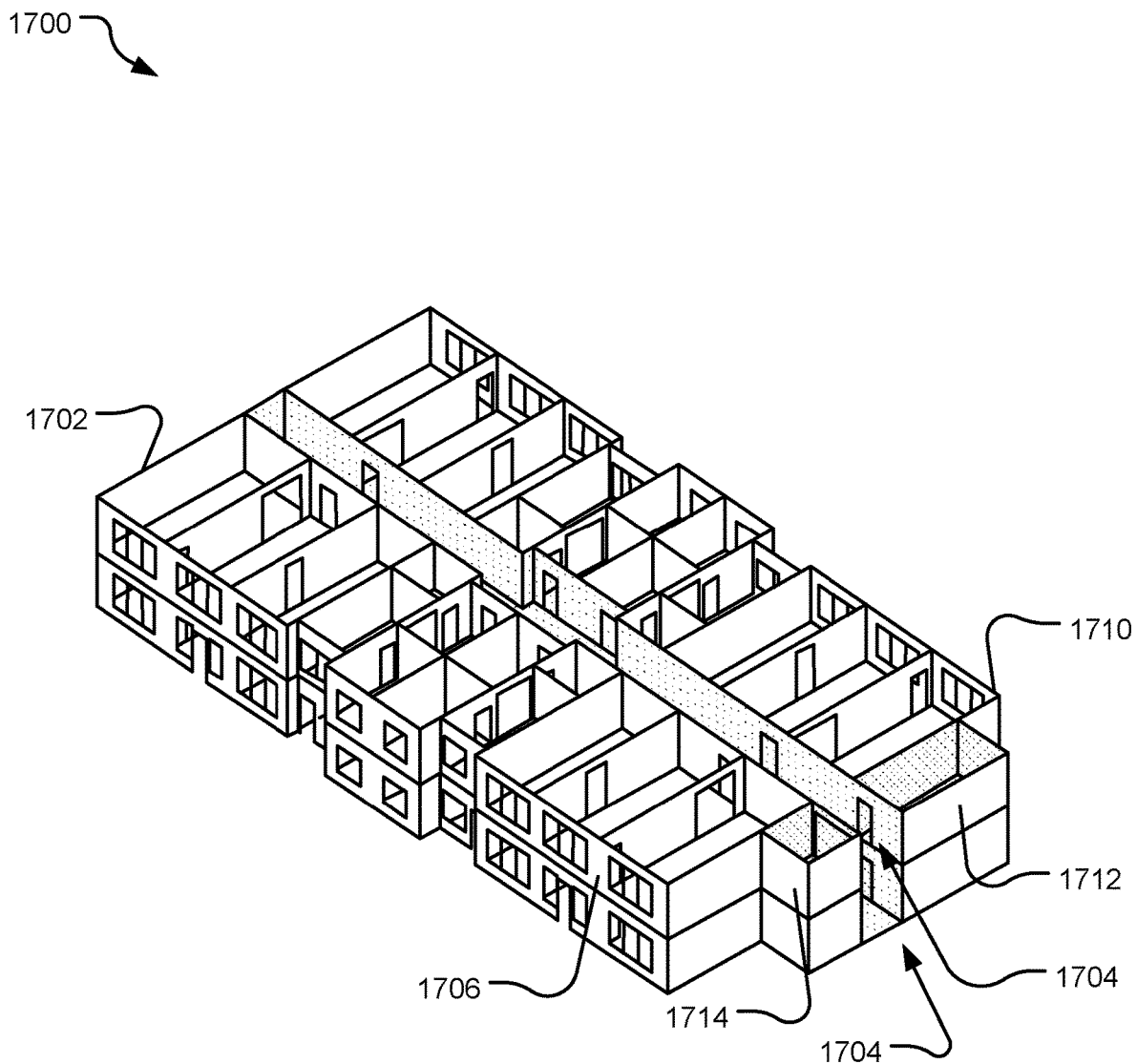
FIG. 17 illustrates an example three-dimensional view of a building design.

FIG. 17 illustrates an example three-dimensional view 1700 of a building design 1702. Specifically, FIG. 17 illustrates the partial building design 1702 as a user of the smart plans portal described herein designs a building. The user may design the first floor of the building design using a plurality of predesigned elements (e.g., an apartment unit 1708). The user extends the first floor to automatically generate the second floor. As various units and floors are added, the smart plans portal integrates the structural and equipment components with various adjacent structural and equipment components to generate a building design that includes the necessary components. Each component (e.g., wall panel, HVAC unit) that is generated for the building design is associated with a digital identifier that encodes the respective component location, position, etc. relative to a geometric grid (not shown). The smart plans portal further generates hallways (e.g., a hallway 1704) based on spacing between units (e.g., apartment units 1706 and 1710).

A stairwell 1712 and an elevator well 1714 are also example predesigned units that may be provided by the smart plans portal. The stairwell 1712 and the elevator well 1714 designs may include necessary structures and components for creating the stairwell (e.g., rails, risers) and elevator well (e.g., elevator box, lift components, electrical components). These elements and components are automatically integrated with the components of the building structure when placed in the building design 1702. The stairwell 1712 and the elevator well 1714 may be extended to cover two or more floors. Thus, the stairwell 1712 and the elevator well 1714 may be integrated fully within the building designs 1702 structural model.

Figure 18:
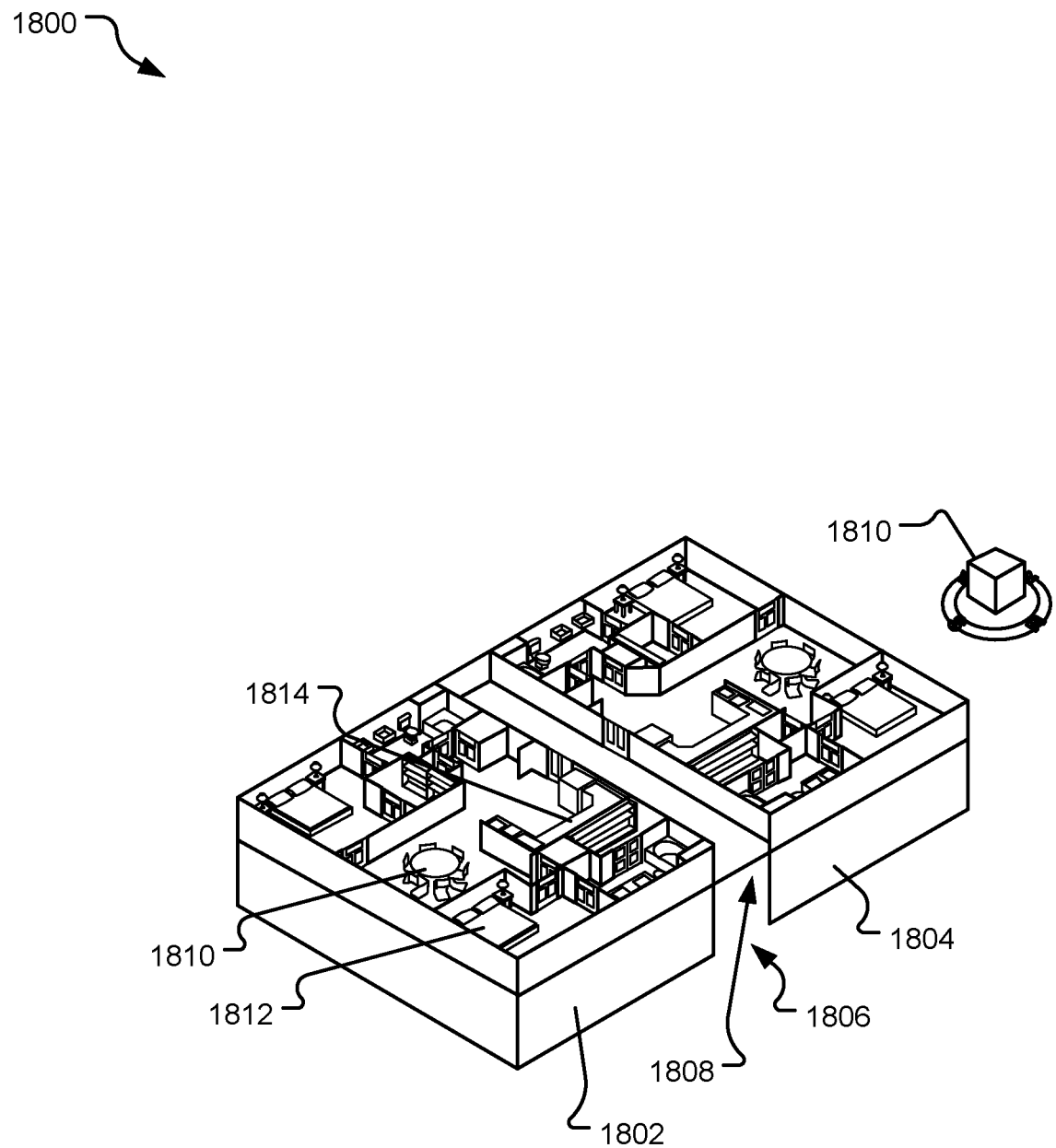
FIG. 18 illustrates an example three-dimensional view of automatically integrated units.

FIG. 18 illustrates an example three-dimensional view 1800 of automatically integrated units 1802 and 1804. Specifically, FIG. 18 illustrates a partial upper floor and a lower floor with integrated units. As the units 1802 and 1804 are positioned in using the smart plans portal, a hallway is automatically generated that connects the space between the two units 1802 and 1804. Furthermore, as the units are extended to the second floor, a hallway ceiling 1808 is automatically generated. Furthermore, a viewing tool 1810 allows a user to rotate, zoom, pan, etc. to view the integrated units 1802 and 1804.

The three-dimension view 1800 further illustrates example furniture and fixture layouts of the integrated units 1802 and 1804. The furniture view is an example view selectable using the smart plans portal. In example implementations, the view may include various wall panels (not shown) that may be transparent to view the interior furniture and fixtures. Example furniture includes a table set 1810, a bed 1812, and a cabinet layout 1814. Other furniture and fixture pieces are illustrated and contemplated. The furniture and fixture layouts may be included in the integrated units 18012 and 1804 as provided by the library of elements. Accordingly, the example furniture and fixture layouts may be viewed before the units are placed into a building design. The furniture and fixture layouts may further be viewed in a complete or partial building design.

Figure 19:
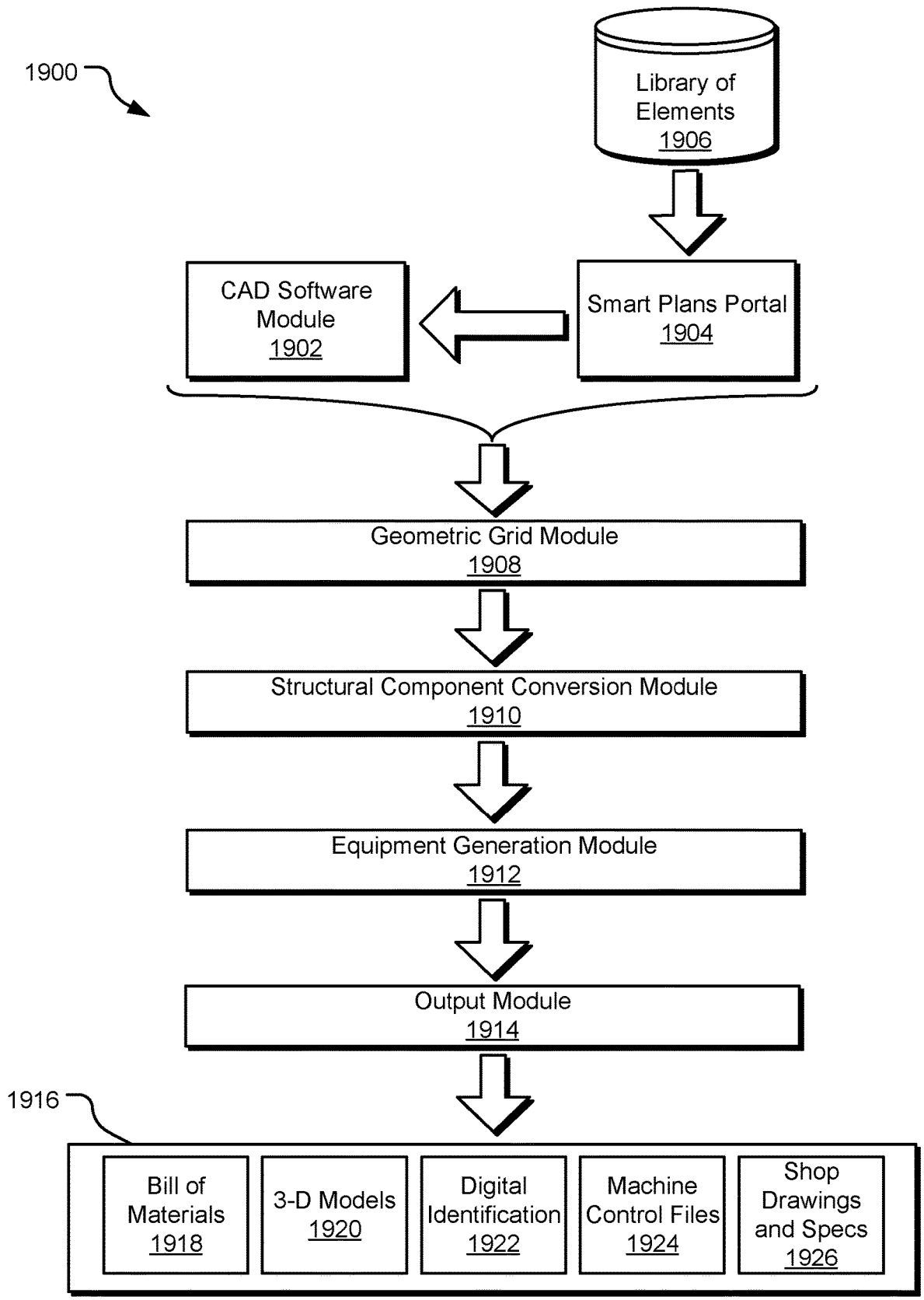
FIG. 19 illustrates an example block diagram of a smart plans system.

FIG. 19 illustrates an example block diagram of a smart plans system 1900. The system 1900 includes a computer aided design (CAD) software module 1902 that is used to generate a design file for a building. An example of the CAD software module 1902 is Revit architectural design software from Autodesk. The design file may be generated in a format, such as AutoCAD DWG file, DXF file, JPEG file, BMP file, GIF file, TXT file, etc. The system includes a smart plans portal 1904 with a library of elements 1906. While the smart plans portal 1904 and the library of elements 1906 are illustrated as being separate from the CAD software module 1902, it should be understood that the library of elements 1906 and the smart plans portal 104 may be integrated with the CAD software module 1902.

The library of elements 1906 includes records that provide predesigned elements such as apartment units, office suites, stairwells, elevators, common areas, etc. Each element of the library of elements may be predesigned using standardized structural components (e.g., wall panels (framing members), trusses, columns, floor panels, etc.) and may include certain equipment component specifications. Such equipment component specifications may include HVAC system A/C unit and duct placement, water supply piping and placement, electrical system placement, etc. Elements may be added to the library of elements using the smart plans portal 1904 or the software module 1902. Furthermore, predesigned elements may be fetched from a remote source such as a cloud and/or remote database. In implementations, the library of elements 1906 is stored remotely such that a user may retrieve one or more elements using a network. The library of elements 1906 may be updated and managed by a remote administrator.

The system 1900 may include another database (not shown) that stores records of structural details for various standardized structural components and equipment components. These records may further include other characteristics of these components such as dimensions, lateral and vertical load bearing capacities, shear capacities, fastening components, etc.

The system includes a geometric gird module 1908 that uses one or more selected and placed predesigned elements. A designer generating a building design using the CAD software module 1902 with the smart plans portal 1904 may select to activate the grid module 1908. Alternatively, the grid module 1908 may be configured to be automatically activated when the CAD software module 1902 is active. As a user places one or more elements on the grid, certain components (e.g., walls) may snap to one or more lines of the geometric grids. The geometric grid module 1902 identifies coordinates for each component of the placed elements. A grid may be generated in each of x, y, and z planes. In some implementations, the geometric grid may be set up as a network of multiple grids at various angles to account for the angles typical in building designs. The geometric grid also allows the activation of several grids at various angles to one another to allow for the design of angled buildings, where active grids snap the components to precise grid coordinates.

The system 1900 includes a structural component conversion module 1910. The structural component conversion module receives a design file based on an arrangement of predesigned elements from the library of elements 1906. Because the elements of the library of elements are predesigned using one or more standardized structural components, the structural component conversion module 1910 generates structural components for the building design. The structural component conversion module accounts for one or more shared components between one or more elements. For example, if two predesigned apartment units are placed adjacent to each other, the structural component conversion module 1910 accounts for one or more shared wall panels and/or framing members.

The system 1900 includes an equipment generation module 1912. The equipment generation module 1912 receives a design file and or structural component file generated based on the placement of one or more predesigned elements and generates an equipment configuration. For example, the equipment specifications of each of the one or more predesigned elements (e.g., apartment units) are determined and equipment specifications for the building design is generated. In a specific example, if two predesigned apartment units are positioned adjacent to each other in a design file, a shared water supply pipe may be generated such that each apartment unit may share the water supply. It should be understood that equipment specifications may be generated for HVAC systems, electrical systems, drainage system etc. for a single floor of a building design and multiple floors of the building design.

The system 1900 also includes an output module 1914 that allows a user to generate various outputs 1916 based on the outputs of the various modules and one or more design files. The output module 1914 may be used at various stages of building design. For example, certain outputs may be generated after a first floor of a building is designed using the predesigned library of elements 1906. At this example stage, outputs may be generated that show the number and/or types of units of the first floor, the total area of livable/non-livable space, of the first floor, various component listings, etc.

The output module 1914 is configured to generate a bill of materials 1918, that lists numbers and types of various structural and/or equipment components. The bill of materials 1918 may further include a listing of fastening screws, bolts, studs, etc. required for the building structure. The bill of materials 1918 is filterable and sortable by floor, component type, etc.

The output module 1916 may also generate three-dimensional model 1920 of the building structure. In some implementations, such 3D models 1920 are dynamically updated such that as the construction or the design of the building progresses, the 3D model 1920 is also updated. The 3D models 1920 may identify and display various structural and equipment components of the building structure. In some implementations, the output module 1914 generates output files s for project engineering review and approval.

The output module 1916 may also generate digital identifications 1922 of various components. Such digital identifications 1922 may include data that describes the component type, material, location and direction relative to one or more lines of the geometric grid(s), adjacent components, connection mechanisms to adjacent components, etc. The data may be referenced or retrieved using generated QR codes that may be placed on the components after such components are manufactured. The QR codes may be utilized in the construction stage to retrieve the encoded data and use the data by engineers in the construction of the building (e.g., how to attach a subject component to another component).

The output module 1916 may also generate machine control files 1924 or macro files that can be used to control various machines used to manufacture structural and equipment components. For example, the machine control files 1924 generated by the output module 1914 may be used to control various light gauge roll forming machines that produce track and stud elements for wall panels and trusses. The output module 1916 also generates shop drawings and specifications 1926 that can be used by the project design team, engineers, and building department.

Figure 20:
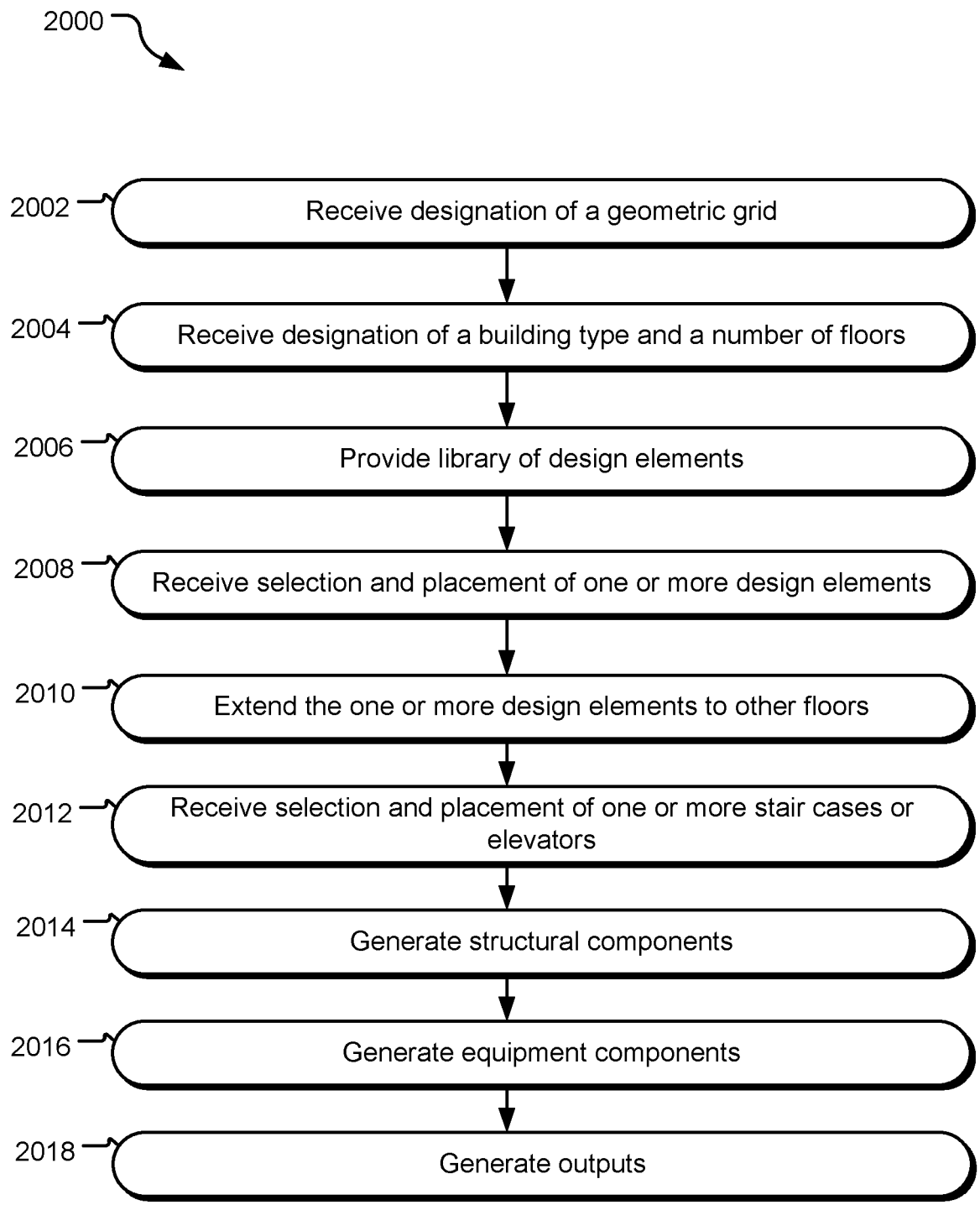
FIG. 20 illustrates example operations for using a smart plans system.

FIG. 20 illustrates example operations 2000 for using a smart plans system described herein. A receiving operation 2002 receives a designation of a geometric grid. For example, a user may select the grid's length, width, and granularity. Based on the user selection, the grid may be generated. A second receiving operation 2004 receives a designation of aa building type and a number of floors for the building. For example, a menu may be provided to the user such that the user may select a building type of residential, commercial or mixed use, and a number and type of each floor (e.g., Prescient floor type). A providing operation 2006 provides a library of predesigned design elements. The design elements may include apartment units, common areas, retail space, elevators, staircases etc. The provided elements may be based on the selected building type. For example, if the user designates that the building is residential type, then the provided elements are apartment units.

A receiving operation 2008 receives selection and placement of one or more design elements on the grid. For example, a user drags and drops a number of provided apartment units onto the grid. The units may snap to various lines or squares of the grid according to the placement. Furthermore, when units or other elements are placed adjacent to another element, then the units are automatically integrated (e.g., shared walls are generated). Furthermore, hallways are automatically recognized and generated based on the arrangement. An extending operation 2010 extends the one or more design elements to subsequent floors. For example, a user designs a first floor with an arrangement of various apartment units. The first-floor design may be extended to the second and third floor. It should be understood that each floor may be separately designed. A receiving operation 2012 receives selection and placement of one or more stair cases and/or elevators. After the user designs two or more floors, the user may place a predesigned staircase and/or elevator into a designated space. The predesigned staircase and elevator automatically integrate with components of the predesign elements (e.g., apartment units, common areas, etc.).

A first generating operation 2014 generates structural components based on the building design. The arrangement of the predesigned elements that are based on standardized components (e.g., wall panels, trusses, etc.) may be used to generate the structural components. The structural components may have an associated digital identifier that may be used to generate various attributes of the structural component. For example, the digital identifier may include data that recognizes the component type, position relative to the grid, material, shape, weight, connection mechanisms, etc. A second generating operation 2016 generates equipment components based on the building design. The arrangement of predesigned elements that may have equipment specifications (e.g., HVAC units, water supply pipes, etc.) are used to generate equipment components for each floor and the entire building.

A third generating operation 2020 generates one or more outputs. Such outputs may include 3D models that are displayed on a user interface. Such displayed models may be filterable to illustrate various structural components or equipment components, or finished designs (e.g., showing finished building with drywall, furniture, appliances, etc.). Other generated outputs include bills of material, shop and specification drawings, machine control or macro files, etc. The digital identifier for the structural components and equipment components may also be generated.

Figure 21:
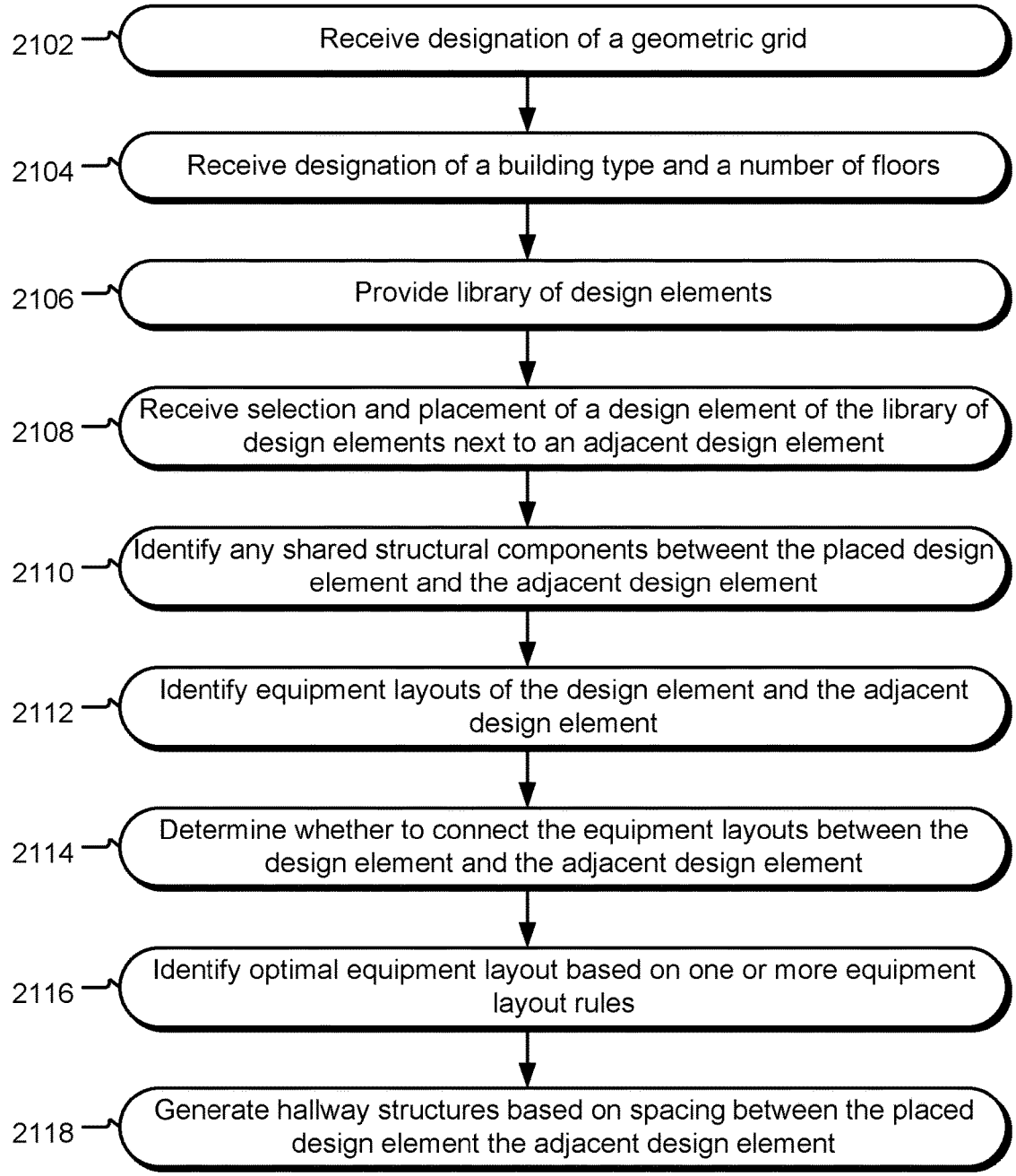
FIG. 21 illustrates example operations for integration of elements using a smart plans system.

FIG. 21 illustrates example operations 2100 for integration of elements using the smart plans system described herein. A receiving operation 2102 receives a designation of a geometric grid. For example, a user may select the grid's length, width, and granularity. Based on the user selection, the grid may be generated. A second receiving operation 2104 receives a designation of aa building type and a number of floors for the building. For example, a menu may be provided to the user such that the user may select a building type of residential, commercial or mixed use, and a number and type of each floor (e.g., Prescient floor type). A providing operation 2106 provides a library of predesigned design elements. The design elements may include apartment units, common areas, retail space, elevators, staircases etc. The provided elements may be based on the selected building type. For example, if the user designates that the building is residential type, then the provided elements are apartment units.

A receiving operation 2108 receives selection and placement of one or more design elements on the grid next to an adjacent design element. An identifying operation 2110 identifies any shared structural components between the placed design element and the adjacent design elements. For example, the identifying operation 2110 may identifies shared walls, framing members, columns, etc. A second identifying operation 2112 identifies equipment layouts of the design element and the adjacent design element. For example, the second identifying operation 2112 may identify HVAC system components, electrical components, water supplies, waste drain locations, etc. A determining operation 2114 determines whether to connect the equipment layouts between the design element and the adjacent design element. For example, the determining operation 2114 may determine that waste drains or electrical are connectable. An identifying operation 2116 identifies an optimal equipment layout based on one or more equipment layout rules. A generating operation 2116 generates hallway structures based on spacing between the design element and the adjacent design element. The hallway structure may include trusses, walls, equipment components (e.g., lighting), etc.

Figure 22:
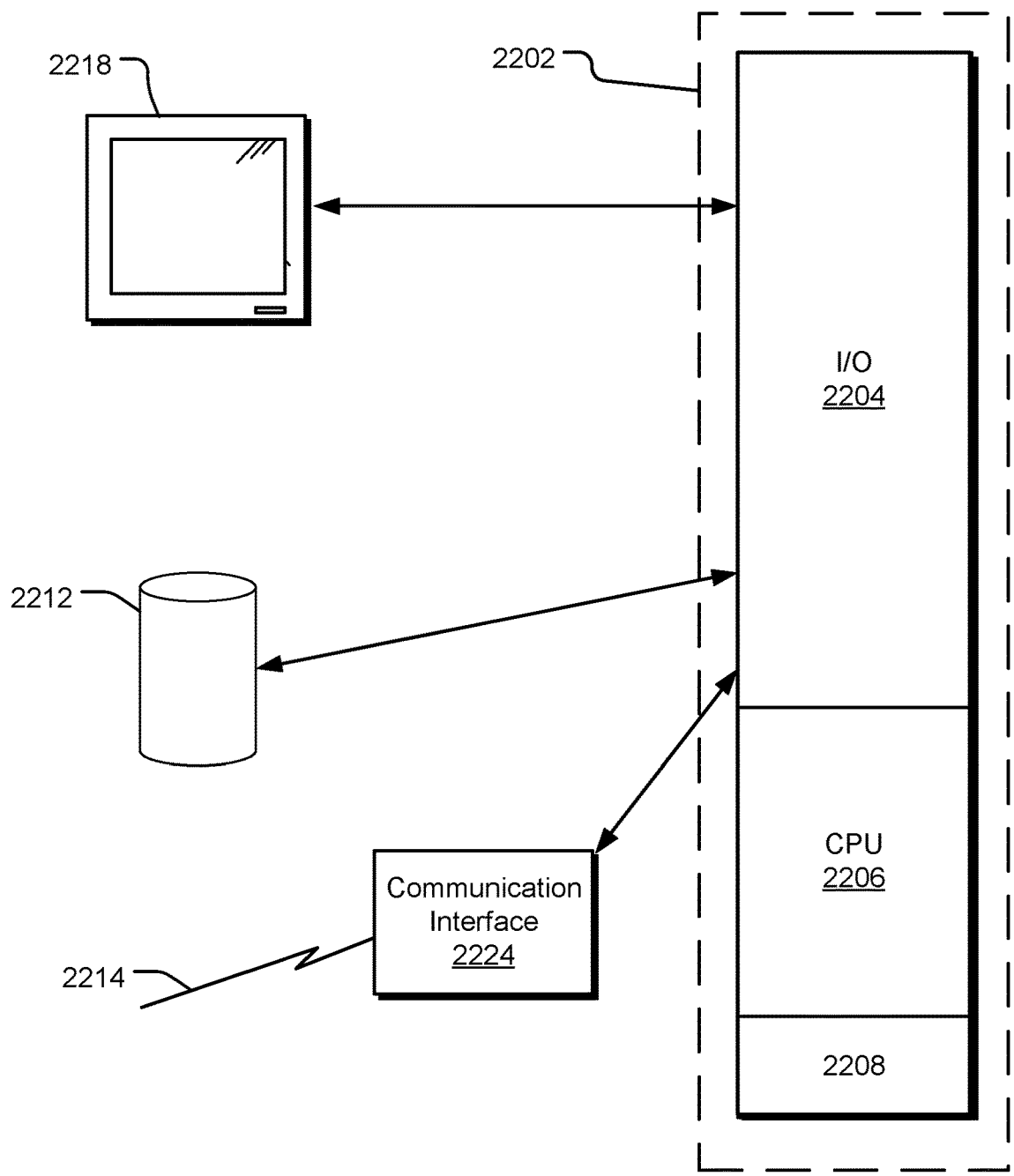
FIG. 22 illustrates an example processing system that may be useful in implementing the described technology.

FIG. 22 illustrates an example processing system 2200 that may be useful in implementing the described technology. The computer system 2200 is capable of executing a computer program product embodied in a tangible computer-readable storage medium to execute a computer process. Data and program files may be input to the computer system 2200, which reads the files and executes the programs therein using one or more processors. Some of the elements of a computer system 2200 are shown in FIG. 22 wherein a processor 2202 is shown having an input/output (I/O) section 2204, a Central Processing Unit (CPU) 2206, and a memory section 2208. There may be one or more processors 2202, such that the processor 2202 of the processing system 2200 comprises a single central-processing unit 2206, or a plurality of processing units. The processors may be single core or multi-core processors. The processing system 2200 may be a conventional computer, a distributed computer, or any other type of computer. The described technology is optionally implemented in software loaded in memory 2208, a disc storage unit 2212, and/or communicated via a wired or wireless network link 2214 on a carrier signal (e.g., Ethernet, 3G wireless, 22G wireless, LTE (Long Term Evolution)) thereby transforming the processing system 2200 in FIG. 22 to a special purpose machine for implementing the described operations.

The I/O section 2204 may be connected to one or more user-interface devices (e.g., a keyboard, a touch-screen display unit 2218, etc.) or a disc storage unit 2212. Computer program products containing mechanisms to effectuate the systems and methods in accordance with the described technology may reside in the memory section 2204 or on the storage unit 2212 of such a system 2200.

A communication interface 2224 is capable of connecting the computer system 2200 to an enterprise network via the network link 2214, through which the computer system can receive instructions and data embodied in a carrier wave. When used in a local area networking (LAN) environment, the processing system 2200 is connected (by wired connection or wirelessly) to a local network through the communication interface 2224, which is one type of communications device. When used in a wide-area-networking (WAN) environment, the processing system 2200 typically includes a modem, a network adapter, or any other type of communications device for establishing communications over the wide area network. In a networked environment, program modules depicted relative to the processing system 2200 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module and other modules may be embodied by instructions stored in memory 2208 and/or the storage unit 2212 and executed by the processor 2202. Further, local computing systems, remote data sources and/or services, and other associated logic represent firmware, hardware, and/or software, which may be configured to assist in building design, model generation, and component generation. A smart plans portal system may be implemented using a general-purpose computer and specialized software (such as a server executing service software), a special purpose computing system and specialized software (such as a mobile device or network appliance executing service software), or other computing configurations. In addition, data, such as elements, component data, rules, machine learning data and system optimization parameters may be stored in the memory 2208 and/or the storage unit 2212 and executed by the processor 2202.

The implementations of the invention described herein are implemented as logical steps in one or more computer systems. The logical operations of the present invention are implemented (1) as a sequence of processor-implemented steps executed in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" (e.g., memory 2208) means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" or "storage medium" expressly does not include a transitory medium such as a carrier signal, but the computer instructions can be transferred to the memory wirelessly.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. While embodiments and applications of this invention have been shown, and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for designing a structure, the method comprising:

receiving a selection of one or more predesigned elements and placement of the one or more predesigned elements on a designated geometric grid using a graphical user interface (GUI), wherein the GUI is configured to allow a user to select a unit and a first floor plan including the one or more predesigned elements and to allow the user to add the one or more predesigned elements to the geometric grid, wherein the unit is at least one of an apartment unit and an office suit predesigned using standardized structural components and wherein the GUI is further configured to allow the user to sort the predesigned elements by building type, unit type, number of bedrooms, square feet, and location of rooms;

integrating the selected and placed one or more predesigned elements with one or more adjacent elements on the designated geometric grid; and identifying a location and position of a plurality of structural components based on the integrated one or more predesigned elements and the one or more adjacent elements, each of the plurality of structural components associated with a digital identification identifying at least the position and the location of the structural component relative to the designated geometric grid, and extending the first floor plan to subsequent floors with the one or more predesigned elements including stairwell and elevator well without having to separately design each floor; wherein the stairwell or elevator well cover two or more floors with two or more structural components including rails, risers, elevator box, lift components and electrical components.

2. The method of claim 1 wherein integrating the selected and placed one or more predesigned elements with the one or more adjacent elements on the designated geometric grid further comprises:
identifying shared structural components of the plurality of structural components based on a plurality of structural components included in the one or more predesigned elements and a plurality of structural components included in the one or more adjacent elements, the identifying be further based on a position and location of the one or more predesigned elements relative to the one or more adjacent elements.

3. The method of claim 1 wherein the plurality of structural components includes at least one of wall panels, trusses, and structural columns.

4. The method of claim 1 further comprising:
identifying one or more equipment components based on the identified and linked equipment layouts between the predesigned elements and the one or more adjacent elements; and
generating the digital identification for the identified one or more equipment components and associating the generated digital identification with the one or more identified equipment components, the digital identification for the identified one or more equipment components identifying at least the position and the location of the associated one or more equipment components relative to the designated geometric grid.

5. The method of claim 1 wherein integrating the selected and placed one or more predesigned elements with the one or more adjacent elements on the designated geometric grid further comprises:
generating a hallway based on an identified spacing between the selected and placed one or more predesigned elements and the one or more adjacent elements, the generated one or more hallways including one or more of the plurality of structural components.

6. The method of claim 1 wherein the one or more predesigned elements include at least one of a predesigned apartment layout, a predesigned office suite, an elevator, and a staircase.

7. One or more non-transitory readable storage media encoding processor-executable instructions for executing on a computer system a process comprising:
receiving a selection of one or more predesigned elements and placement of the one or more predesigned elements on a designated geometric grid using a graphical user interface (GUI), wherein the GUI is configured to allow a user to select and a unit and a first floor plan including the one or more predesigned elements and to allow the user to add the one or more predesigned elements to the geometric grid, wherein the unit is at least one of an apartment unit and an office suit predesigned using standardized structural components and wherein the GUI is further configured to allow the user to sort the predesigned elements by building type, unit type, number of bedrooms, square feet, and location of rooms;
integrating the selected and placed one or more predesigned elements with one or more adjacent elements on the designated geometric grid; and
identifying a location and position of a plurality of structural components based on the integrated one or more predesigned elements and the one or more adjacent elements, each of the plurality of structural components associated with a digital identification identifying at least the position and the location of the structural component relative to the designated geometric grid, and
extending the first floor plan to subsequent floors with the one or more predesigned elements including stairwell and elevator well without having to separately design each floor; wherein the stairwell or elevator well cover two or more floors with two or more structural components including rails, risers, elevator box, lift components and electrical components.

8. The one or more non-transitory readable storage media of claim 7 wherein integrating the selected and placed one or more predesigned elements with the one or more adjacent elements on the designated geometric grid further comprises:
identifying shared structural components of the plurality of structural components based on a plurality of structural components included in the one or more predesigned elements and a plurality of structural components included in the one or more adjacent elements, the identifying be further based on a position and location of the one or more predesigned elements relative to the one or more adjacent elements.

9. The one or more non-transitory readable storage media of claim 7 wherein the plurality of structural components includes at least one of wall panels, trusses, and structural columns.

10. The one or non-transitory readable storage media of claim 7 the computer process further comprising:
identifying one or more equipment components based on the identified and linked equipment layouts between the predesigned elements and the one or more adjacent elements; and
generating the digital identification for the identified one or more equipment components and associating the generated digital identification with the one or more identified equipment components, the digital identification for the identified one or more equipment components identifying at least the position and the location of the associated one or more equipment components relative to the designated geometric grid.

11. The one or more non-transitory readable storage media of claim 7 wherein integrating the selected and placed one or more predesigned elements with the one or more adjacent elements on the designated geometric grid further comprises:
generating a hallway based on an identified spacing between the selected and placed one or more predesigned elements and the one or more adjacent elements, the generated one or more hallways including one or more of the plurality of structural components.

12. The one or more non-transitory readable storage media of claim 7 wherein the one or more predesigned elements include at least one of a predesigned apartment layout, a predesigned office suite, an elevator, and a staircase.

13. A system for designing a structure, the system comprising:
a library of elements providing one or more predesigned elements, each of the one or more predesigned elements presented for selection by a user;
a structural component conversion module configured to receive a selection and a placement of one or more of the predesigned elements on a designated geometric grid and to integrate the selected and placed one or more predesigned elements with one or more adjacent elements on the designated geometric grid;

a graphical user interface (GUI) configured to allow a user to select a unit and a first floor plan including the one or more predesigned elements and to allow the user to add the one or more predesigned elements to the geometric grid, wherein the unit is at least one of an apartment unit and an office suit predesigned using standardized structural components and wherein the GUI is further configured to allow the user to sort the predesigned elements by building type, unit type, number of bedrooms, square feet, and location of rooms; and a geometric grid module configured to receive the designation of the geometric grid and identify a location and position of a plurality of structural components based on the integrated one or more predesigned elements and the one or more adjacent elements, each of the plurality of structural components associated with a digital identification identifying at least the position and the location of the structural component relative to the designated geometric grid, and extending the first floor plan to subsequent floors with the one or more predesigned elements including stairwell and elevator well without having to separately design each floor; wherein the stairwell or elevator well cover two or more floors with two or more structural components including rails, risers, elevator box, lift components and electrical components.

14. The system of claim 13 wherein the geometric grid module integrates the selected and placed one or more predesigned elements with one or more adjacent elements on the designated geometric grid by identifying equipment layouts between the predesigned elements and the one or more adjacent elements and linking the equipment layouts between the predesigned elements and the one or more adjacent elements.

15. The system of claim 14 wherein identifying equipment layouts between the one or more predesigned elements further comprises identifying an optimal layout based on one or more equipment layout rules.

16. The system of claim 13 wherein the plurality of structural components includes at least one of wall panels, trusses, and structural columns.

17. The system of claim 13 wherein the one or more predesigned elements include at least one of a predesigned apartment layout, a predesigned office suite, an elevator, and a staircase.

* * * * *